United States Patent [19]

Ryoichi et al.

[11] Patent Number: 5,113,427
[45] Date of Patent: May 12, 1992

[54] RADIO-SIGNAL-RESPONSIVE VEHICLE DEVICE CONTROL SYSTEM

[75] Inventors: Kimura Ryoichi; Hattori Noriaki, both of Saitama; Watabe Kazuharu, Tokyo, all of Japan

[73] Assignee: Honda Giken Kogyo Kabushiki Kaisha, Tokyo, Japan

[21] Appl. No.: 572,686

[22] Filed: Aug. 24, 1990

Related U.S. Application Data

[63] Continuation of Ser. No. 283,928, Nov. 21, 1988.

[30] Foreign Application Priority Data

| Mar. 31, 1987 | [JP] | Japan | 62-47914 |
| Apr. 1, 1987 | [JP] | Japan | 62-79895 |
| Mar. 31, 1988 | [WO] | PCT Int'l Appl. | PCT/JP88/00330 |

[51] Int. Cl.⁵ .................................. H04M 11/00
[52] U.S. Cl. ........................ 379/57; 340/825.44; 340/825.48; 367/197; 180/167; 307/10.1
[58] Field of Search .................. 379/57-59, 379/63; 340/425.5, 426, 441, 531, 539, 825.31, 825.44, 825.48, 825.69, 825.71, 825.72; 367/197-199; 180/167; 307/10.1, 10.3, 10.6

[56] References Cited

U.S. PATENT DOCUMENTS

| 3,703,714 | 11/1972 | Andrews | 340/426 |
| 4,503,528 | 3/1985 | Nojiri et al. | 367/198 |
| 4,523,178 | 6/1985 | Fulhorst | 340/426 |
| 4,602,256 | 7/1986 | Kago et al. | 367/197 |
| 4,704,608 | 11/1987 | Sato et al. | 340/825.44 |
| 4,719,460 | 1/1988 | Takeuchi et al. | 340/825.31 |
| 4,747,122 | 5/1988 | Bhagat et al. | 379/57 |
| 4,835,533 | 5/1989 | Akutsu | 340/825.31 |
| 4,962,522 | 10/1990 | Marian | 379/57 |

OTHER PUBLICATIONS

Motorola publication, DYNA T.A.C. 6000X, Universal Mobile Telephone, pp. 1-6, 1984.

Primary Examiner—James L. Dwyer
Assistant Examiner—Dwayne D. Bost
Attorney, Agent, or Firm—Lahive & Cockfield

[57] ABSTRACT

A radio-signal-responsive vehicle device control system including a receiver unit (9, 41, 74, 100) for receiving a radio signal generated based on a signal transmitted from a calling telephone unit and for generating a detectable signal based on the received radio signal, receiver unit storage structure (8, 91, 102) mounted in a motor vehicle for storing the receiver unit, a detector (D, 42, 73) for producing a detected signal in response to detection of the detectable signal from the receiver unit, a control unit (S, S', 43, 60) responsive to the detected signal from the detector for producing a control signal based on at least the detectable signal, and an actuator (A, F, 52, 56, 46, 68, 75, 517A) for controlling at least one device in the motor vehicle based on the control signal from the control unit. The vehicle device control system allows the vehicle device to be remotely controlled through a simple and low-cost arrangement, making it possible for a vehicle radio telephone unit with no reception capability to receive and transmit a signal.

12 Claims, 23 Drawing Sheets

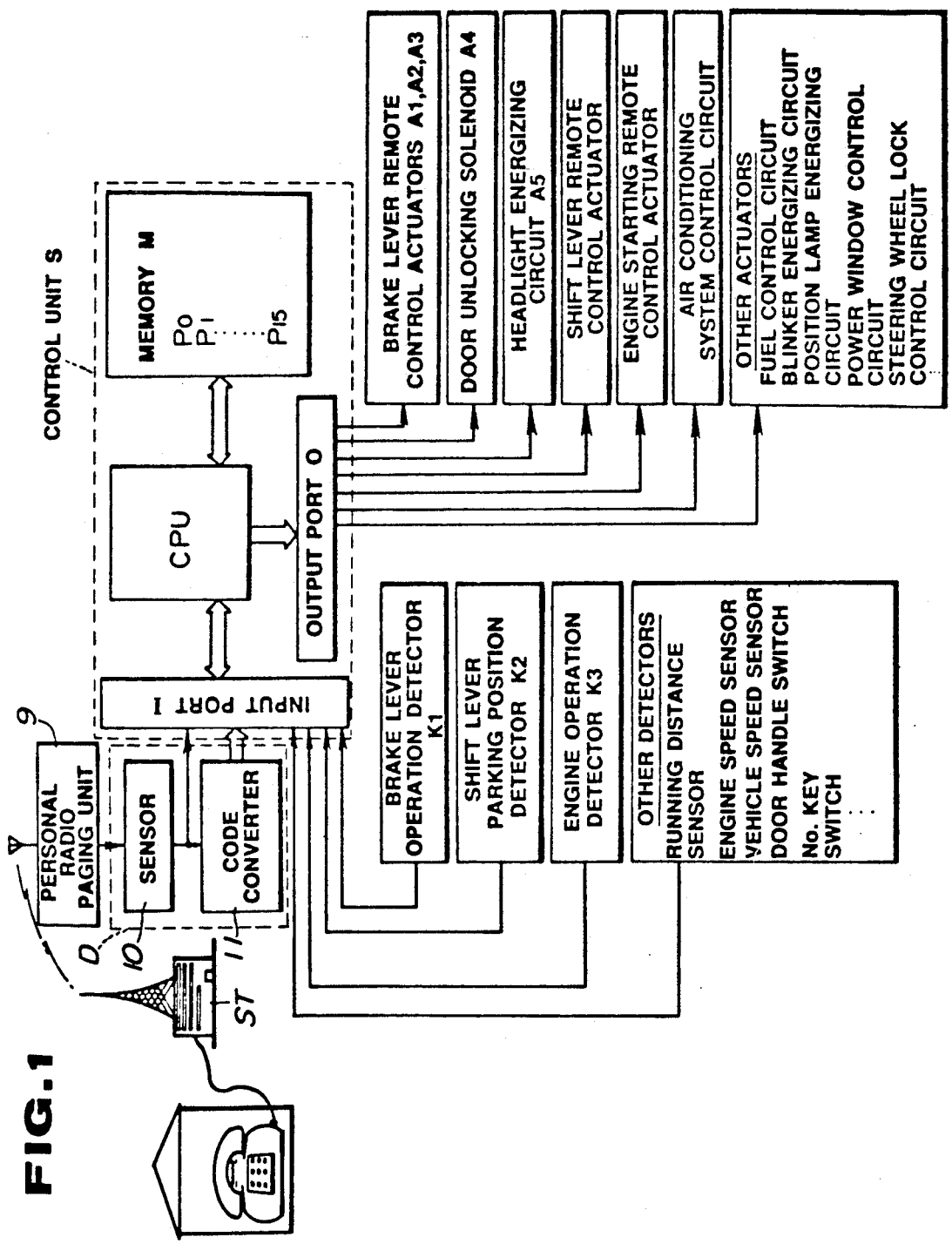

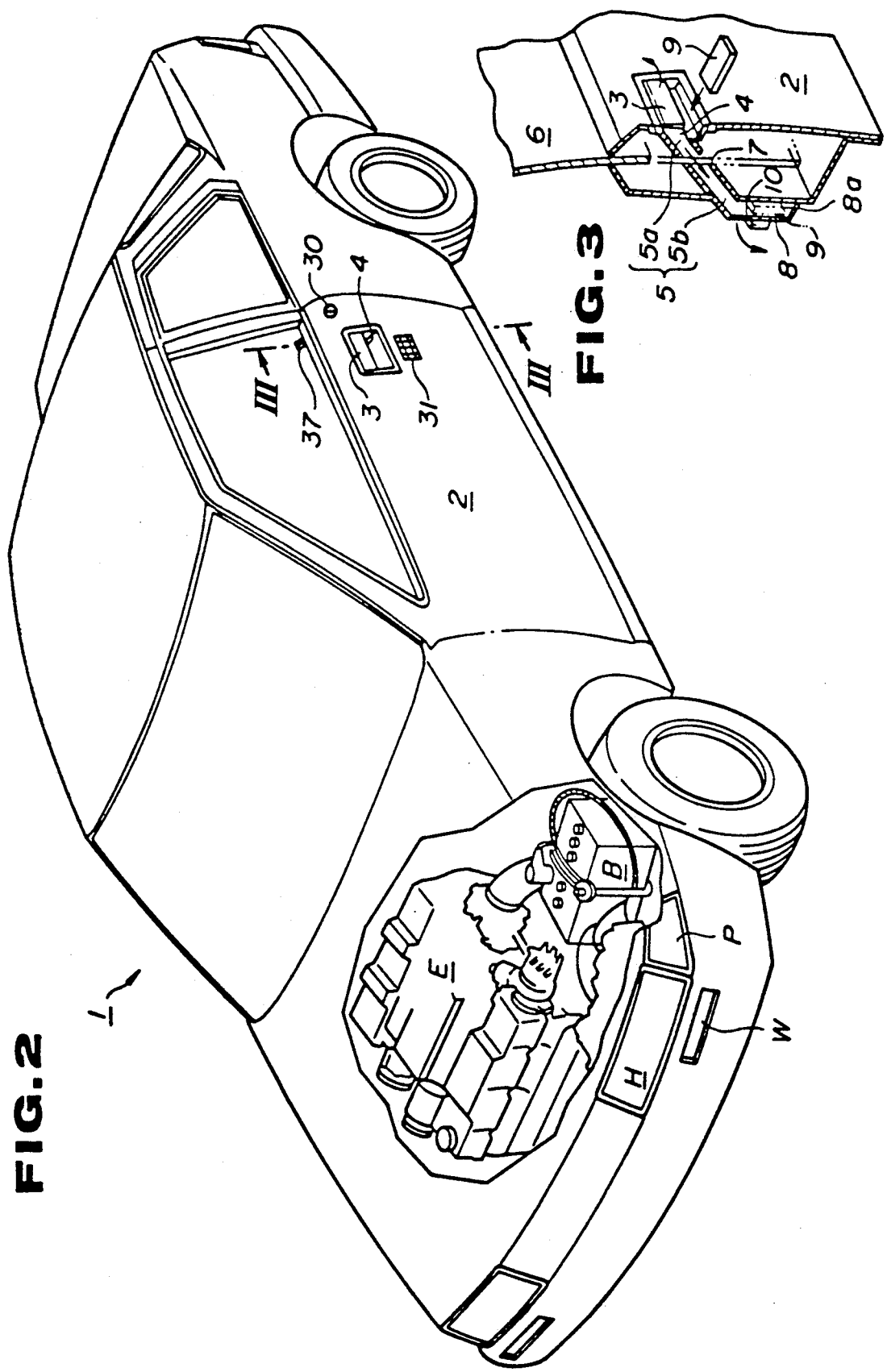

RADIO-SIGNAL-RESPONSIVE VEHICLE DEVICE CONTROL SYSTEM

This is a continuation of application Ser. No. 283,928, filed Nov. 21, 1988.

TECHNICAL FIELD

The present invention relates to a radio-signal-responsive control system for controlling various devices on a motor vehicle, and more particularly to a radio-signal-responsive vehicle device control system employing a small-size personal radio paging unit as a receiver unit.

BACKGROUND ART

Various techniques have been proposed to automatically allow a motor vehicle such as an automobile to warm up or to automatically cool or warm the passenger compartment of the motor vehicle before the driver gets into the motor vehicle especially when the weather is cold or hot.

Japanese Laid-Open Patent Publication No. 55-148739 discloses an automatic warming-up device which includes a timer for starting the engine of an automobile to get it warm several minutes before a certain desired time to start the automobile in motion, particularly in a cold winter morning. When the driver enters the automobile at the desired starting time, the automobile has already warmed up, and hence can immediately be moved.

If the time to start the automobile is changed, however, the driver has to go to a parking lot where the automobile is parked, and to set the timer again to a new starting time.

Another system includes a remote control unit installed at a suitable location in an automobile and a radio control unit for operating the remote control unit. The remote control unit can be operated by a control signal transmitted from the radio control unit. With this system combined with the above automatic warming-up device of the automobile, the driver does not have to go to the parking lot to set the timer again. The system may also be hooked up with various devices in an automobile to control these devices. For example, various lights of the automobile may be controlled by the system so that they can later be turned off under remote control when the driver forgot to turn them off or is not sure if they were turned off when the automobile was parked. The doors of the automobile may be locked by the remote control system when the driver forgot to lock them or is not sure if they were locked at the time the driver left the parked automobile. The driver may instruct the remote control system to get on the handbrake when the driver forgot to pull the handbrake or is not sure if the handbrake was on in the parked automobile.

The above remote control system is however disadvantageous in that it is expensive since both the remote control unit and the radio control unit are manufactured, and considerations have to be given to the radio law and regulations.

Automobile radio telephone units are currently in use as an automobile-mounted device as disclosed in Japanese Laid-Open Utility Model Publication No. 61-195661. Such automobile radio telephone units employ pushbutton dialing as with ordinary telephone units for both signal transmission and reception. An automobile radio telephone unit moves with an automobile in which it is mounted, and transmits and receives a call through a nearby radio station.

The user of an automobile radio telephone unit often finds it difficult to dial the telephone number of a party to be called through the pushbutton dialing system within the vibrating automobile as it runs. Therefore, there is a demand for an automobile radio telephone unit which can be operated more simply and reliably. An automobile radio telephone unit is necessarily equipped with a tracking device which transmits a radio wave to indicate the location of the automobile radio telephone unit at all times in order to determine a radio station which is to be used when receiving an incoming signal. Since the tracking device is indispensable, the entire automobile radio telephone system is complex and highly costly.

Recently, personal radio paging units have widely been used which receive a radio signal transmitted from an ordinary telephone unit to summon the person carrying the paging unit. Ordinary personal radio paging units generate a buzzer sound in response to a radio signal received.

Japanese Laid-Open Patent Publication No. 55-133149 discloses a mobile message communication system employing a personal radio paging unit. In the disclosed system, an encoded message is transmitted to the personal radio paging unit, which receives, stores, decodes, and displays or reproduces the message as a voice sound.

According to a selective paging unit or personal radio paging unit disclosed in Japanese Patent Publication No. 59-3839, a signal for calling the person carrying the unit is produced as an acoustic sound, and if there are a number of persons calling the person carrying the unit, some pieces of information for identifying the calling persons such as the names or telephone numbers are displayed on a display screen on the paging unit. The information is however displayed on the display screen on the paging unit for a limited period of time. If the paging unit is carried by the driver of a motor vehicle such as an automobile, the driver may find it difficult to confirm the displayed information or may fail to catch the calling sound while driving the automobile. Where there are a plurality of calling parties, the driver may forget who called him and when the calls came.

DISCLOSURE OF THE INVENTION

The inventors have achieved the present invention in order to effectively solve the aforesaid problems with respect to the control of various devices in a motor vehicle such as an automobile.

It is an object of the present invention to provide a radio-signal-responsive vehicle device control system which employs a small-size receiver unit that can receive a calling signal from a general telephone unit, for remotely controlling an automobile-mounted device, and which takes up only a small space, can be manufactured inexpensively, and can be used easily by anybody.

Another object of the present invention to provide a radio-signal-responsive vehicle device control system which allows a vehicle telephone unit with no signal reception capability to perform both signal reception and transmission with a simple and inexpensive arrangement.

To achieve the above objects, there is provided in accordance with the present invention a radio-signal-responsive vehicle device control system comprising a receiver unit for receiving a radio signal generated based on a signal transmitted from a calling telephone unit and for generating a detectable signal based on the received radio signal, receiver unit storage means mounted in a motor vehicle for storing the receiver unit, detector means for producing a detected signal in response to detection of the detectable signal from the receiver unit, control means responsive to the detected signal from the detector means for producing a control signal based on at least the detectable signal, and actuator means for controlling at least one device in the motor vehicle based on the control signal from the control means.

The actuator means comprises receiver-transmitter means for automatically producing an outgoing signal to dial the calling telephone unit so as to be connected through to the calling telephone unit based on an outgoing transmission signal from the control means, and a telephone unit which can be connected through to the calling telephone unit via the receiver-transmitter means based on a connection control signal from the control means.

BRIEF DESCRIPTION OF THE DRAWINGS

FIG. 1 is a block diagram of a radio-signal-responsive vehicle device control system according to a first embodiment of the present invention;

FIG. 2 is a perspective view of a motor vehicle incorporating therein the radio-signal-responsive vehicle device control system of the first embodiment;

FIG. 3 is a fragmentary sectional perspective view of a door handle area of the motor vehicle shown in FIG. 2;

Figure 4:
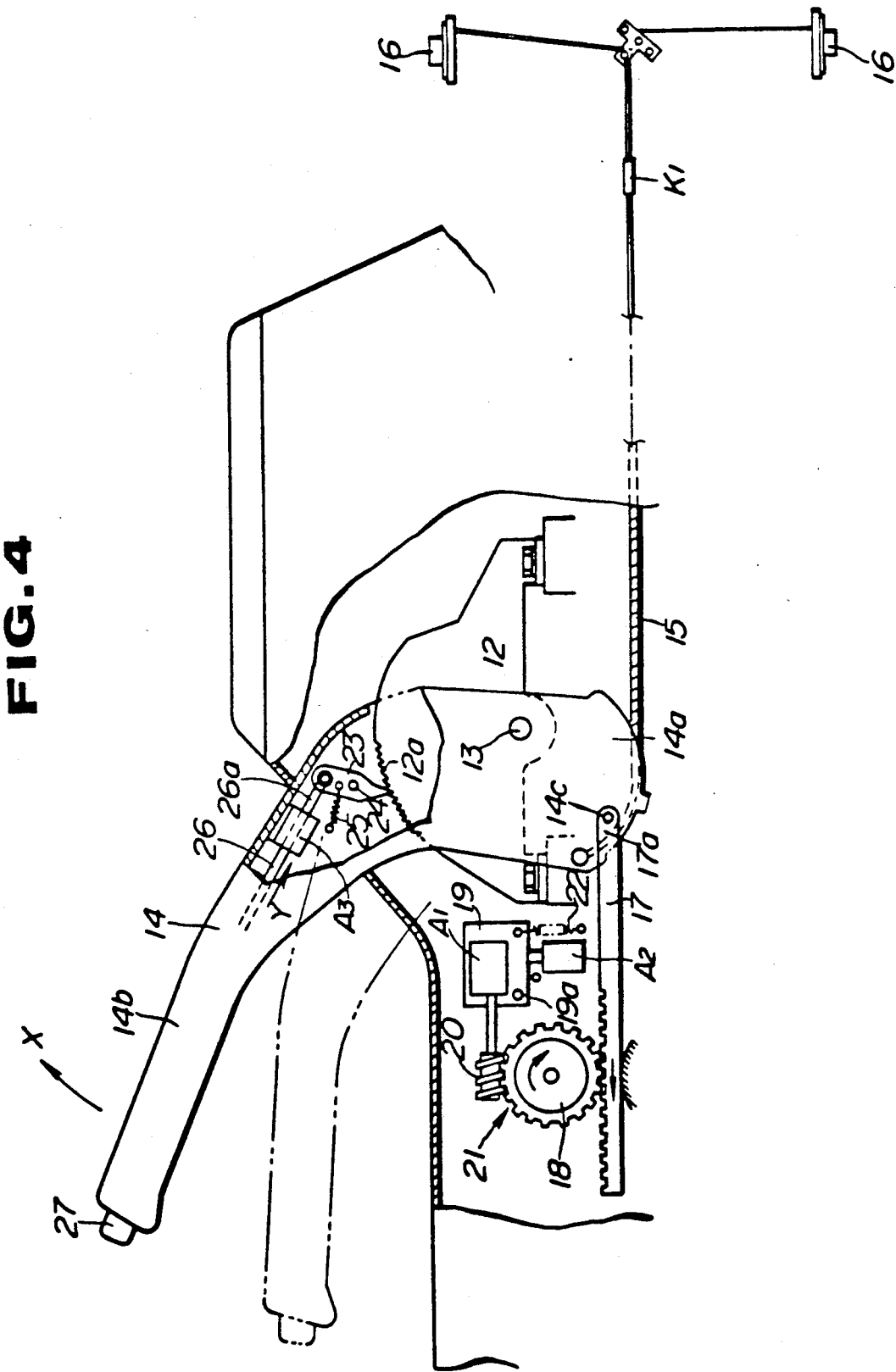
FIG. 4 is an elevational view of a device for actuating the handbrake lever of the motor vehicle of FIG. 2.

A radio-signal-responsive vehicle device control system according to a first embodiment of the present invention will hereinafter be described with reference to the accompanying drawings.

As shown in FIGS. 2 and 3, a motor vehicle or automobile 1 has an engine E, a battery B, and headlights L. The automobile 1 also has a door 2 with a receiver insertion slot 4 defined therein behind a door handle 3 mounted on the outer panel of the door 2. The receiver insertion slot 4 is connected to a guide passage 5 defined in the door 2. The guide passage 5 includes an outer guide passageway 5a and an inner guide passageway 5b between which there is defined a slit 7 for passage of a window glass panel 6 therethrough. The inner guide passageway 5b is connected to a storage box 8 disposed as a receiver storage means on the inner panel of the door 2 which is normally disposed in the passenger compartment of the automobile 1. The storage box 8 is angularly movably mounted on the inner panel of the door 2 by means of a hinge 8a. A personal radio paging unit 9 can easily be taken into and out of the storage box 8 by a person in the passenger compartment. When the window panel 6 is lowered into the slit 7, the guide passage 5 is closed by the window glass panel 6. When the window glass panel 6 is lifted, the personal radio paging unit 9 which is inserted from outside through the receiver insertion slot 4 is slid through the guide passage 5 into the storage box 8. Since the slit 7 is of a small width, the inserted personal radio paging unit 9 is smoothly guided through the guide passage 5 without dropping into the slit 7.

The personal radio paging unit 9 which is employed as a receiver unit in this embodiment generates a calling sound and a message sound when it receives a radio calling signal and a signal such as a message signal following the radio calling signal. More specifically, when the personal radio paging unit 9 receives a radio calling signal and a following message signal, it generates a calling sound and a message sound as signals which can be detected by a detector means comprising a sensor 10 and a code converter 11 (described below).

The sensor 10 is disposed in a position near the storage box 8. The sensor 10 comprises either a microphone for detecting a calling sound and a message sound which are produced by the personal radio paging unit 9 or a pickup coil for detecting a change in the magnetic flux of a loudspeaker in the personal radio paging unit 9.

When the sensor 10 detects a calling sound given off from the personal radio paging unit 9, the sensor 10 issues a signal to turn on the code converter 11 and a control unit S serving as a control means, as shown in FIG. 1. The sensor 10 is also constructed to convert a message sound following the calling sound from the personal radio paging unit 9 into an electric signal and to transmit the electric signal to the code converter 11. The code converter 11 then converts the transmitted electric signal to a prescribed operating electric signal (such as a four-digit binary code signal, e.g., "0010"), and delivers the operating electric signal to the control unit S. The sensor 10 and the code converter 11 jointly constitute a detector means D. Thus, a detectable signal generated by the personal radio paging unit 9 is detected by the detector means D, and a detected signal or operating electric signal is transmitted from the detector means D to the control unit or means S.

The control unit S comprises a microcomputer which is normally employed in recent automobiles. As shown in FIG. 1, the control unit S is arranged to operate various actuators in response to input signals (such as signals indicating various detected conditions of the automobile and signals from driver-operated members such as knobs, switches, and the like) other than the input signal from the personal radio paging unit 9. The signal input means which are not related to the personal radio paging unit 9 and the actuators which are operable in response to input signals from those signal input means will not be described below as they have not direct bearing on the present invention.

The control unit S comprises a memory M storing various control programs P0, P1, P2, . . . , an input port I, an output port 0, and a central processing unit CPU including a timer circuit TM (not shown). In the illustrated embodiment, the program P0 is a program for operating the handbrake lever of the automobile 1 (see FIG. 5), the program P1 is a program for unlocking the doors of the automobile 1 (see FIG. 6), the program P2 is a program for turning on the headlights of the automobile 1 (see FIG. 7), the program P3 is a program for preventing the handbrake from being frozen against movement (see FIG. 8), the program P4 is a program for starting the engine of the automobile 1 (see FIG. 9), and the program P5 is a program for preventing the automobile from being stolen (see FIG. 10).

The central processing unit CPU selects and executes one of the control programs Pi (i=0, 1, 2, . . .) in the memory M in response to an operating electric signal applied from the code converter 11 to the input port I. The central processing unit CPU issues an output signal as a control signal from the output port 0, and the control signal is transmitted through a suitable amplifier (not shown) to a remote control actuator for operating a certain device in the automobile. There are a plurality of remote control actuators A1, A2, . . . , as described later. The input port I is supplied with signals indicating operating conditions from remote control condition detectors serving as condition detecting means which detect conditions of the automobile devices.

The remote control condition detectors include a brake lever operation detector K1, a shift lever/parking position detector K2, an engine operation detector K3, and other detectors. As described later on, dependent on the control program to be executed, the central processing unit CPU corrects the control signal according to an operating condition signal supplied from a remote control condition detector to the input port I.

The radio-signal-responsive vehicle device control system of the present embodiment will be described with reference to the handbrake lever of the automobile which is employed as a vehicle device to be controlled.

As shown in FIG. 4, a support bracket 12 is fixedly mounted on the automobile floor on one side of the driver's seat in the automobile, the support bracket 12 having ratchet teeth 12a on an arcuate edge thereof. A handbrake lever 14 is rotatably supported on a support shaft 13 supported on the support bracket 12. The handbrake lever 14 has a lower portion 14a and a grip 14b serving as an upper portion. The lower portion 14a has a pin 14c thereon and is connected to a handbrake cable 15. When the grip 14b is manually lifted to turn the handbrake lever 14 clockwise in the direction of the arrow X in FIG. 4, the handbrake cable 15 is pulled to operate a pair of laterally spaced rear wheel brakes 16. The handbrake cable 15 has a handbrake operation detector (i.e., a tension sensor) K1 serving as a remote control condition detector. The tension sensor K1 produces a signal when the tension of the handbrake cable 15 which is pulled is increased beyond a certain value.

To the pin 14c on the handbrake lever 14, there is rotatably coupled a rear end 17a of a movable rack 17 which is movable in the longitudinal or fore-and-aft direction of the automobile (i.e., in the lateral direction in FIG. 4). The movable rack 17 is held in mesh with a free pinion 18 adjacent to which a swing plate 19 swingable about a shaft 19a is disposed. A handbrake lever remote control actuator (i.e., a handbrake lever remote control motor) A1 is fixedly supported on the swig plate 19. The handbrake lever remote control motor A1 has a rotatable output shaft with a worm gear 20 mounted on its distal end. The worm gear 20 is brought into mesh with the free pinion 18 when the swing plate 19 is angularly moved into a suitable position. The components denoted by the reference numerals 17 through 20 jointly constitute an actuating force transmitting means 21. Between the swing plate 19 and an automobile body, there is disposed a tension spring 22 for normally urging the swing plate 19 to turn in one direction (i.e., clockwise in FIG. 4) to keep the worm gear 20 out of mesh with the free pinion 18. Another remote control actuator for controlling the transmission of an actuating force (i.e., a solenoid for controlling the transmission of an actuating force) A2 is positioned adjacent to the swing plate 19. When the solenoid A2 is energized, it generates magnetic forces to actuate its plunger to turn the swing plate 19 counterclockwise (FIG. 4) about the shaft 19a, thus bringing the worm gear 20 and the free pinion 18 into mesh with each other.

The grip 14b of the handbrake lever 14 accommodates therein a ratchet pawl 23 angularly movably supported on a shaft 24 adjacent to the ratchet teeth 12a on the support bracket 12. A tension spring 25 is coupled between the ratchet pawl 23 and the grip 14b for normally urging the ratchet pawl 23 into engagement with the ratchet teeth 12a. A rod 26 is longitudinally movably supported in the grip 14b, the rod 26 having an end 26a (i.e., a lower end in FIG. 4) angularly movably connected to the upper end of the ratchet pawl 23. A knob 27 is mounted on the upper distal end of the rod 26 and projects from the distal end of the grip 14b. When the knob 27 is pushed into the grip 14b, the rod 26 is moved in the direction of the arrow Y to turn the ratchet pawl 23 out of engagement with the ratchet teeth 12a. A handbrake lever unlocking actuator serving as a remote control actuator (i.e., a solenoid for unlocking the handbrake lever) A3 is disposed on of the rod 26. When the handbrake lever unlocking solenoid A3 is energized, the rod 26 is moved in the direction of the arrow Y to displace the ratchet pawl 23 out of engagement with the ratchet teeth 12a.

As can be understood from the above description with respect to FIG. 4, when the handbrake lever 14 is in an inoperative position, the solenoids A3, A2 can be energized under remote control and thereafter the motor A1 can be energized under remote control to cause the handbrake lever 14 to actuate the rear wheel brakes 16. When the handbrake lever 14 is operated and the tension of the handbrake cable 14 is increased beyond a certain value, the tension sensor K1 issues a signal. At this time, the rear wheel brakes 16 are operated, and the output signal from the tension sensor K1 which indicates the operation of the rear wheel brakes 16 is applied to the input port I shown in FIG. 1.

Operation of the first embodiment will be described below.

First, the personal radio paging unit 9 is either stored in the storage box 8 by a person in the passenger compartment, or inserted from outside into the receiver insertion slot 4 behind the door handle 3. If the personal radio paging unit 9 is inserted into the receiver insertion slot 4, then the inserted personal radio paging unit 9 drops down the guide passage 5 into the storage box 8 on the inner panel of the door 2 which is located in the passenger compartment. A calling number is dialed by the pushbuttons of a general wire telephone unit TEL (FIG. 1), and those pushbuttons which represent a code number, e.g., "000" (decimal notation) corresponding to a desired message signal are pushed. A radio wave indicating these calling and message numbers is automatically radiated from a fixed radio station St of a telephone company, and the personal radio paging unit 9 receives the calling number and the following message number "000". In response to the calling number, the personal radio paging unit 9 generates a calling sound which is detected by the sensor 10. The sensor 10 then issues an output signal to turn on the power supply of the code converter 11 and the control unit S. Then, the personal radio paging unit 9 generates a sound corresponding to the message signal "000" which is subsequently received. The sensor 10 detects this sound and converts it into an electric signal, and then transmits the electric signal to the code converter 11. The code converter 11 converts the electric signal, representing "000" (decimal notation) into a prescribed operating electric signal, i.e., a four-digit binary digital code signal "0000". The code signal "0000" is then sent to the control unit S, which then selects and executes a program corresponding to the code signal "0000", i.e., the control program P0 stored in the memory M. As described above, the control program P0 is a program for operating the handbrake under remote control, and is executed to remotely control the handbrake when the driver forgot to pull the handbrake lever 14 or is not certain if he applied the handbrake.

Figure 5:
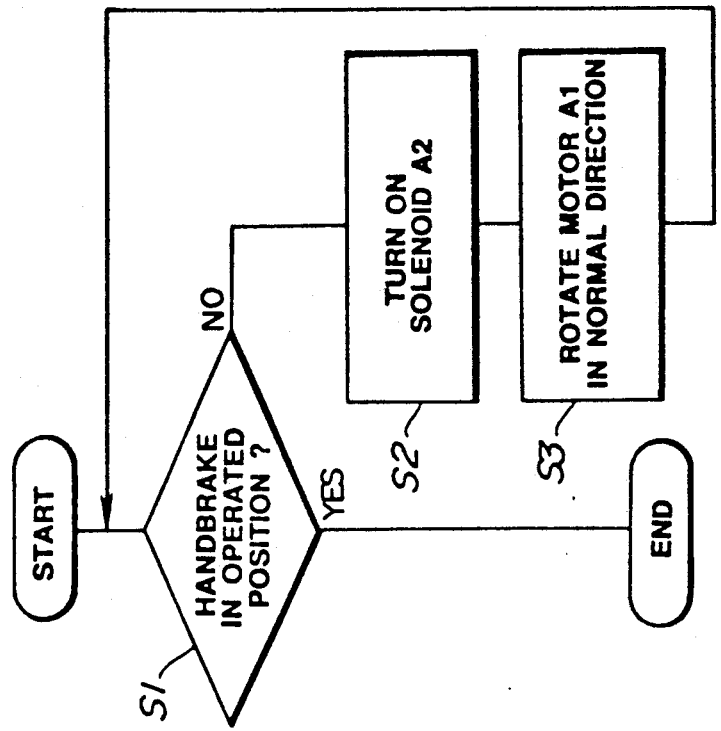
FIG. 5 is a flowchart of a program for actuating the handbrake lever.

The program P0 for operating the handbrake will be described with reference to FIG. 5.

The control unit S first determines whether the handbrake lever 14 is in an operative position or not in a step S1 based on an input signal from the tension sensor K1. If the handbrake lever 14 is in the operative position, then control ends the control program P0. If not in the operative position, then the solenoid A2 for controlling the transmission of an actuating force is turned on in a step S2. The swing plate 19 is turned counterclockwise (FIG. 4) about the shaft 19a to bring the worm gear 20 into mesh with the free pinion 18, so that rotation of the handbrake lever remote control motor A1 can be transmitted to the free pinion 18. Then, the motor A1 is energize to rotate in normal direction in a step S3 to rotate the free pinion 18 clockwise in FIG. 4. At this time, the movable rack 17 is moved to the left in FIG. 4, thus turning the handbrake lever 14 clockwise in FIG. 4 about the support shaft 13. The clockwise angular movement of the handbrake lever 14 tensions the handbrake cable 15 to the extent which exceeds a prescribed value, whereupon the tension sensor K1 produces a signal. When the signal from the tension sensor K1 is applied to the control unit S, the central processing unit CPU determines that the handbrake is operated. The control program P0 is now brought to an end, turning off the power supply of the code converter 11 and the control unit S.

The program P1 for unlocking the doors shown in FIG. 6 will be described below. The program P1 is executed to remotely control a door unlocking solenoid to unlock the doors if the driver has locked the doors when the key to the doors was left in the automobile.

When the personal radio paging unit 9 shown in FIG. 1 receives a message signal "001", it produces a message sound corresponding to the received message signal "001". The sensor 10 detects the produced message sound, converts the message sound into an electric signal, and then transmits the electric signal to the code converter 11. The code converter 11 then converts the applied electric signal into a prescribed operating electric signal, i.e., a four-digit binary digital code signal "0001". The code signal "0001" is then transmitted to the control unit S, which selects and executes a program corresponding to the code signal "0001", i.e., the door unlocking program P1 stored in the memory.

Figure 6:
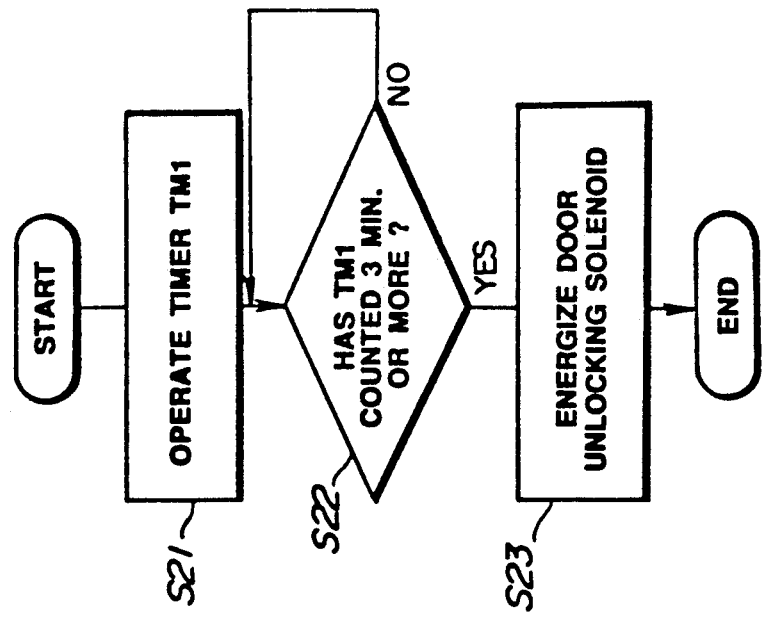
FIG. 6 is a flowchart of a program for unlocking a door.

The control unit S starts a timer TM1 in a step S21 in FIG. 6. Then, the control unit S determines whether or not the timer TM1 has counted 3 minutes or more in a step S22. If the timer TM1 has counted 3 minutes or more, the control unit S energizes a door unlocking solenoid A4 (FIG. 1). The door unlocking solenoid A4 is energized after 3 minutes or more have been counted by the timer TM1, on the assumption that it takes 3 minutes for the driver to return to the place where the automobile is parked after he sent the signal from a telephone unit near the automobile to the personal radio paging unit 9 in the automobile. The doors of the automobile are therefore unlocked when the driver returns to the automobile. This prevents the automobile from being stolen. Thereafter, the power supply of the code converter 11 and the control unit S is turned off, and the door unlocking program P1 is ended.

The program P2 for turning on the headlights shown in FIG. 7 will be described below. The control program P2 is executed to turn on the headlights of the automobile under remote control to know the location of the automobile when the driver cannot locate the automobile in a large parking lot.

When the personal radio paging unit 9 shown in FIG. 1 receives a message signal "0021", it produces a signal sound corresponding to the message signal "002", and the sensor 10 converts the detected signal sound into an electric signal which is transmitted to the code converter 11. The code converter 1 then converts the applied electric signal into a prescribed operating electric signal, i.e., a four-digit binary digital code signal "0010". The code signal "0010" is applied to the control unit S, which then selects and executes a program corresponding to the code signal "0010", i.e., the control program P2 for turning on the headlights.

Figure 7:
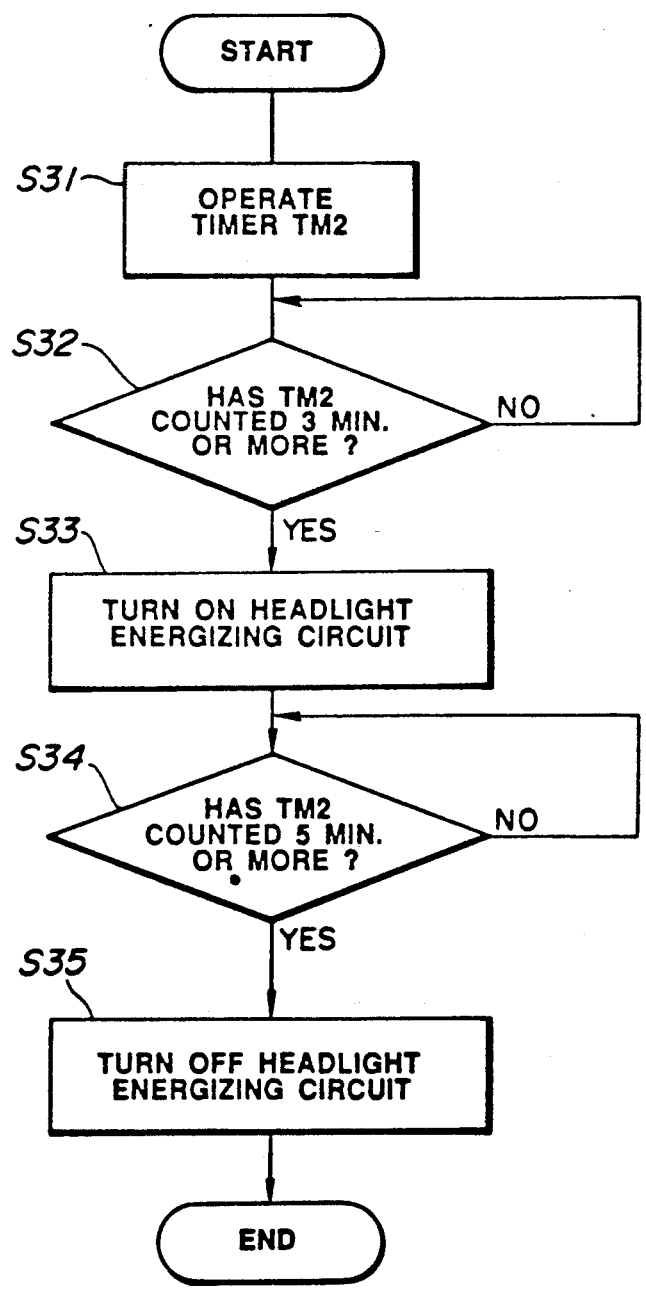
FIG. 7 is a flowchart of a program for turning on and off a headlight.

The control unit S first starts a timer TM2 in a step S31 in FIG. 7. Then, the control unit S determines whether or not the timer TM2 has counted 3 minutes or more in a step S32. After the timer TM2 has counted 3 minutes or more, the control unit S energizes a headlight energizing circuit A5 (see FIG. 1). The headlight energizing circuit A5 is energized after 3 minutes or more have been counted by the timer TM2, on the assumption that it takes 3 minutes for the driver to return to the place where the automobile is parked after he sent the signal from a telephone unit near the automobile to the personal radio paging unit 9 in the automobile. The headlight energizing circuit A5 is therefore turned on when the driver returns to the parking lot where the automobile is located. This prevents the battery on the automobile from being wastefully consumed. Then, the control unit S determines whether or not the timer TM2 has counted 5 minutes or more in a step S34. After 5 minutes or more have been counted by the timer TM2, the control unit S turns off the headlight energizing circuit A5 in a step S35. Therefore, the headlight energizing circuit A5 is energized upon elapse of 3 minutes after the timer TM2 has started counting the time, and turns on the headlights for 2 minutes. It is easily possible for the driver to locate the automobile while the headlights are being energized for 2 minutes. Thereafter, the power supply of the code converter 11 and the control unit S is turned off, and the control program P2 comes to an end.

The time periods which are to be counted by the timers TM in the above examples may be varied, and so may be the time periods to be counted by other timers which will be described below.

Figure 8:
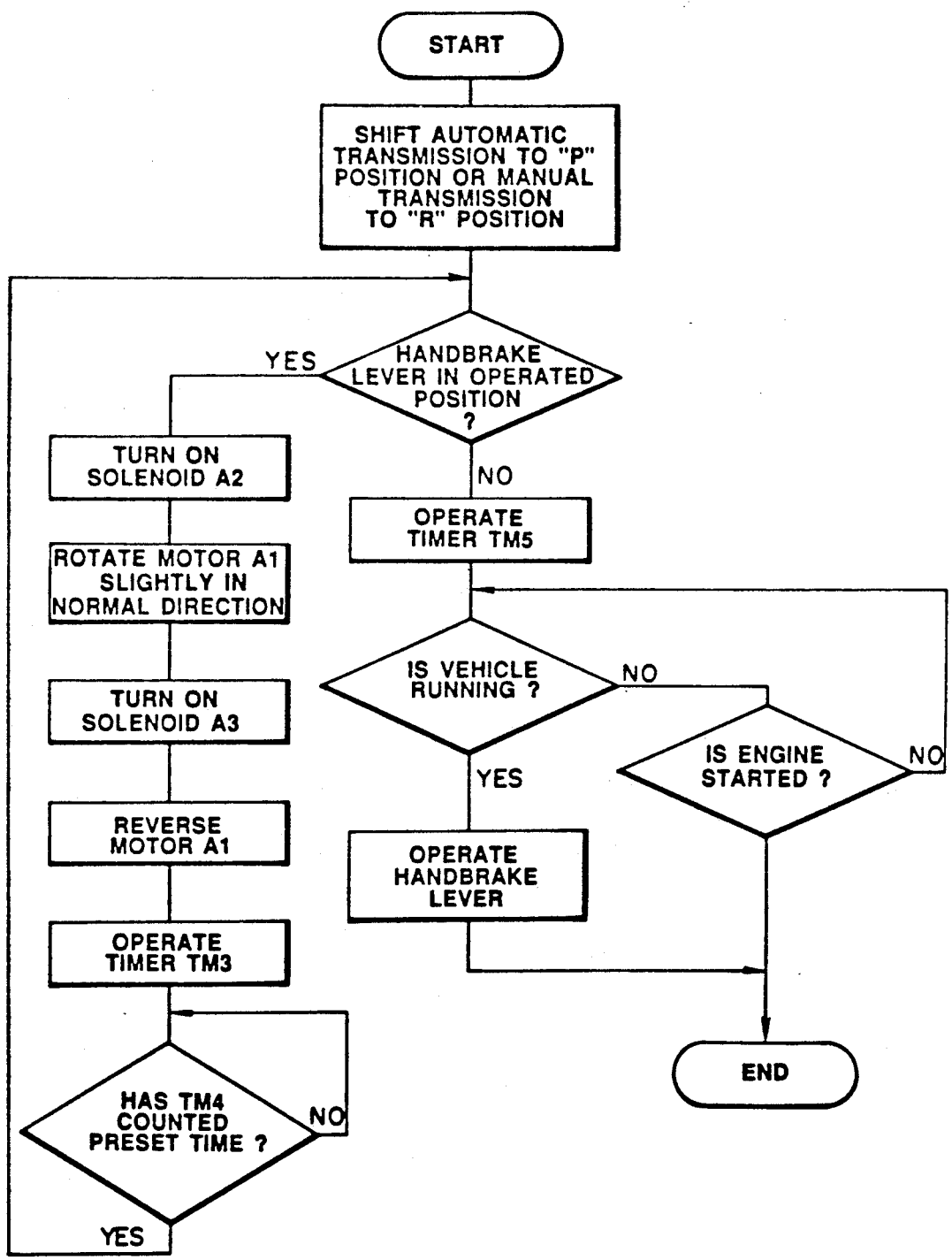
FIG. 8 is a flowchart of a program for preventing the handbrake from being frozen against movement.

The control program P3 for preventing the handbrake from being frozen against movement, shown in FIG. 8, is employed to prevent the wheel brakes from being frozen by shifting an automatic transmission into a "P" position or a manual transmission into an "I" or "R" position and releasing the handbrake, when the handbrake is applied to park the automobile in a cold climate.

Figure 9:
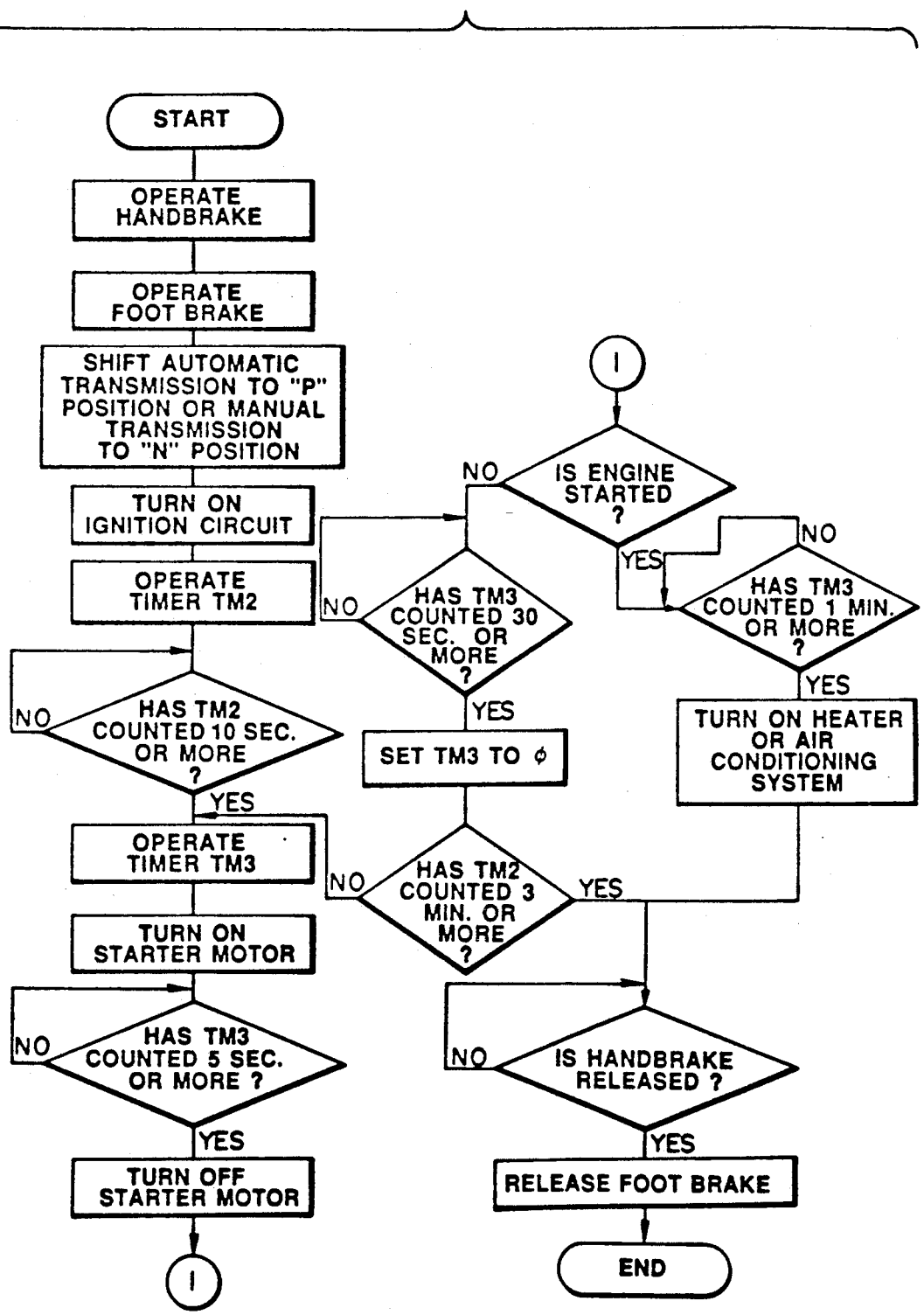
FIG. 9 is a flowchart of a program for starting an engine.

The program P4 for starting the engine of the automobile, shown in FIG. 9, is executed to start the engine under remote control in order to operate the heater or the air-conditioning unit in the automobile.

Figure 10:
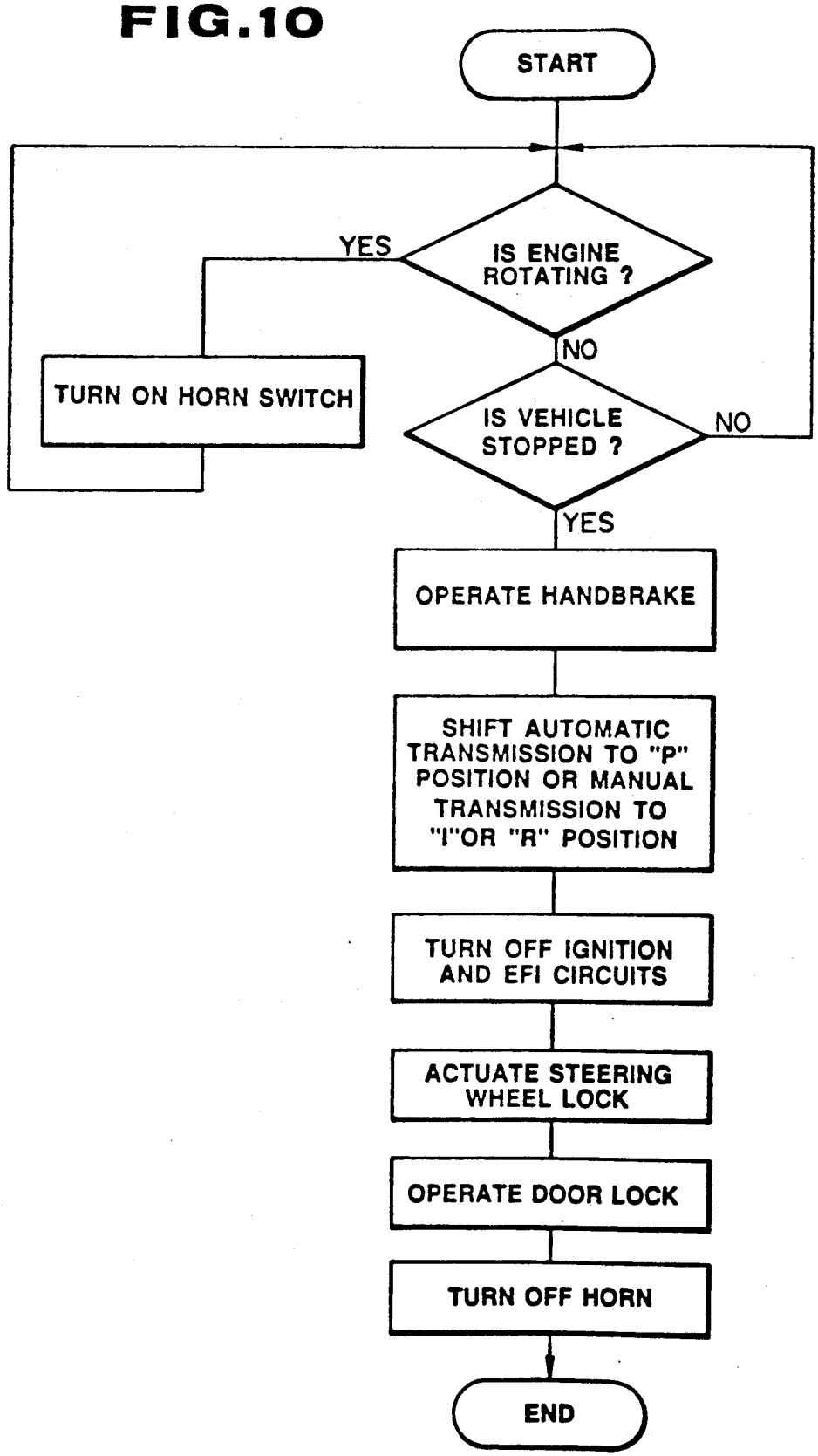
FIG. 10 is a flowchart of a program for preventing the motor vehicle from being stolen.

The program P5 for preventing the automobile from being stolen, shown in FIG. 10, is employed to prevent an automobile theft under remote control by beeping the horn, turning off the ignition circuit and the EFI circuit, locking the steering wheel, or locking the doors. After the program P5 has been executed, the control unit S keeps the ignition circuit and the EFI circuit turned off, the steering wheel locked, or the doors locked unless a releasing cipher code signal is applied.

While the six control programs P0~P5 have been described above, it is possible to store in the memory M various control programs for remotely controlling other devices in the automobile, and to select and execute a desired one of the control programs stored in the memory M.

A first modification of the radio-signal-responsive vehicle device control system of the first embodiment, particularly with respect to the control of various lights such as headlights, will be described with reference to FIG. 11.

Figure 11:
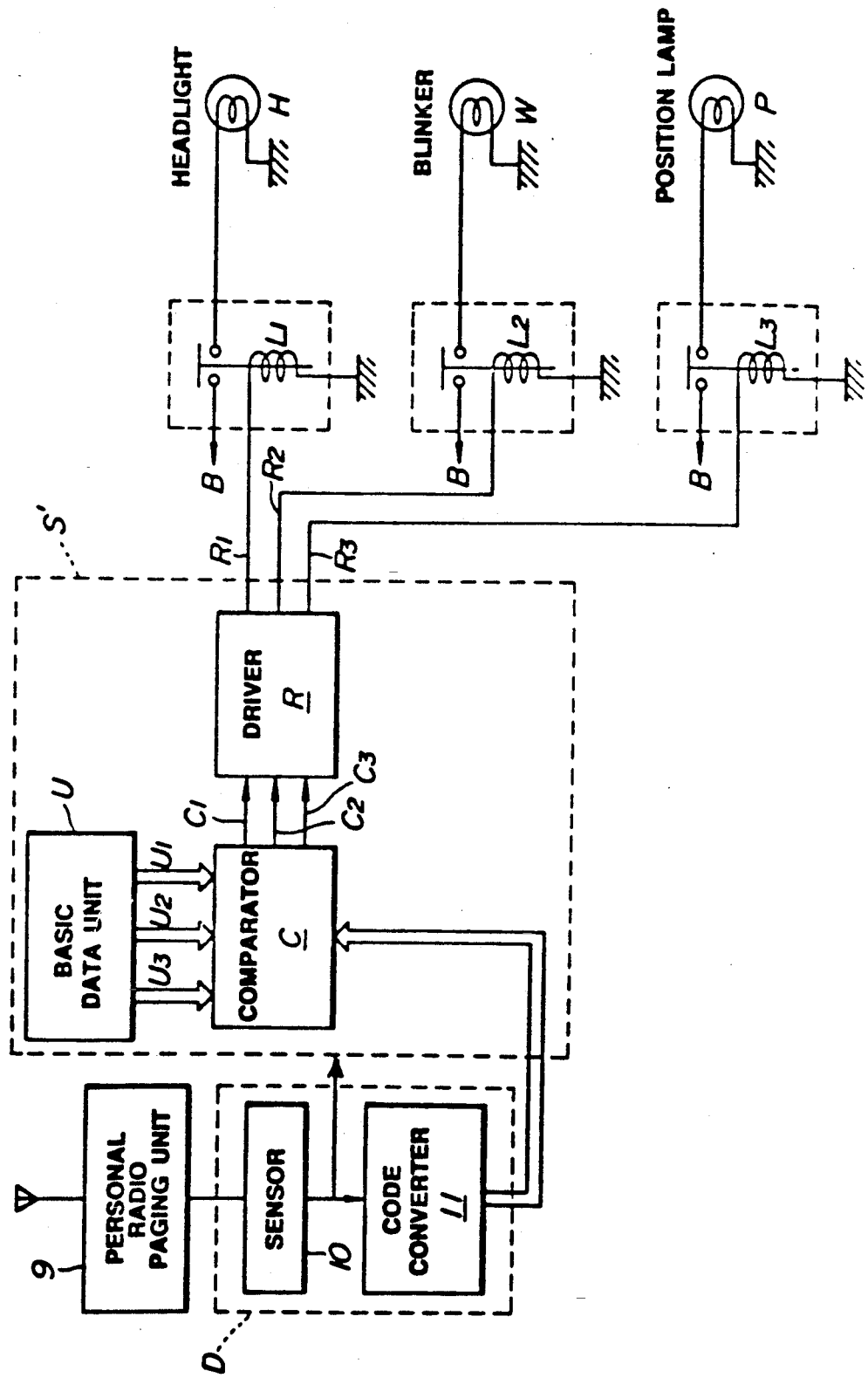
FIG. 11 is a block diagram of a first modification of the radio-signal-responsive vehicle device control system of the first embodiment, with respect to the turning on and off of vehicle lights.

The personal radio paging unit 9 in the radio-signal-responsive vehicle device control system according to the first modification shown in FIG. 11 is identical to the personal radio paging unit 9 of the first embodiment shown in FIG. 1. The personal radio paging unit 9 of the first modification is stored in the same storage box 8 as that of the first embodiment shown in FIG. 3. The sensor 10 and the code converter 11 are also identical in construction to the sensor 10 and the code converter 11 of the first embodiment. Therefore, in response to the detection of a calling sound generated by the personal radio paging unit 9, the sensor 10 generates a signal to turn on the code converter and a control unit S' (described later), and converts a message sound following the calling sound into an electric signal and applies the electric signal to the code converter 11. The code converter 11 converts the applied electric signal into a prescribed operating electric signal (i.e., a four-digit binary code signal such as "0010") and transmits the code signal to the control unit S'. In the first modification, the sensor 10 and the code converter 11 jointly constitute a detector means D which is the same as that of the first embodiment.

The control unit S' comprises a comparator C, a basic data unit U, and a driver R. The basic data unit U has three output ports U1, U2, U3 each for applying a four-digit binary code signal to the comparator C. For example, the output port U1 issues an output signal "0001", the output port U2 an output signal "0101", and the output port U3 an output signal "1010". The output signals from the output ports U1, U2, U3 are compared with the operating electric signal from the code converter 11 by the comparator C. The comparator C is not constructed of a microcomputer, but a digital circuit. The comparator C has three comparator output lines C1, C2, C3 which are connected to the driver R. If the output signal from the output port U1 coincides with the operating electric signal from the code converter 11, then the comparator C issues an output signal over the comparator output line C1. If the output signal from the output port U2 coincides with the operating electric signal from the code converter 11, then the comparator C issues an output signal over the comparator output line C2. The driver R has three driver output lines R1, R2, R3. The driver R issues a signal for driving a remote control actuator to one of the driver output lines R1, R2, R3 dependent on an input signal from any one of the comparator output lines C1, C2, C3. For example, if an output signal is applied from the comparator output line C1 to the driver R, then the driver R produces an output signal over the driver output line R1. If an output signal is applied from the comparator output line C2 to the driver R, then the driver R produces an output signal over the driver output line R2.

The driver output lines R1, R2, R3 are connected respectively to remote control actuators, i.e., a solenoid switch L1 for turning on a headlight circuit, a solenoid switch L2 for turning on a blinker circuit, and a solenoid switch L3 for turning on a position lamp circuit. The solenoid switches L1, L2, L3 are connected to turn on or off headlights H, blinker lights W, and a position lamp P.

Operation of the first modification is as follows:

The first modification, as with the first embodiment, is employed with a communication system in which a calling signal and then a message signal are transmitted to the personal radio paging unit 9 by pushing pushbuttons corresponding to the calling signal and then pushing pushbuttons corresponding to the message signal on a telephone unit equipped with a pushbutton keypad dial. The personal radio paging unit 9 used in such a communication system is stored in the storage box 8 on the inner panel of the door 2. Now, a calling number is dialed on the telephone unit and then a code number corresponding to a desired message signal is dialed by pushing pushbuttons representing "001" (binary notation), for example, on the telephone unit. A radio wave indicating these calling and message numbers is automatically radiated from a radio station, and the personal radio paging unit 9 receives the calling number and the following message number "001". In response to the calling number, the personal radio paging unit 9 generates a calling sound which is detected by the sensor 10. The sensor 10 then issues an output signal to turn on the power supply of the code converter 11 and the control unit S'. Then, the personal radio paging unit 9 generates a sound corresponding to the message signal "001" which is subsequently received. The sensor 10 detects this sound and converts it into an electric signal, and then transmits the electric signal to the code converter 11. The code converter 11 converts the electric signal, representing "001" (decimal notation) into a prescribed operating electric signal, i.e., a four-digit binary digital code signal "0001". The code signal "0001" is then sent to the control unit S' in which the code signal is compared with input signals "0001", "0101", and "1010" from the output ports U1, U2, U3 of the basic data unit U. The code signal "0001" coincides with the input signal "0001" from the output port U1. Therefore, an output signal is issued from the output line C1 of the comparator C to the driver R, which then applies a signal over the driver output line R1 to turn on the solenoid switch L1, thus energizing the headlights H.

When the personal radio paging unit 9 receives a calling signal and a following message signal "005" (decimal notation), the code converter 11 transmits a prescribed operating electric signal, i.e., a four-digit binary digital code signal "0101" to the control unit S' in which the code signal is compared with input signals "0001", "0101", and "1010" from the output ports U1, U2, U3 of the basic data unit U. The code signal "0101" coincides with the input signal "0101" from the output port U2. Therefore, an output signal is issued from the output line C2 of the comparator C to the driver R, which then applies a signal over the driver output line R2 to turn on the solenoid switch L2, thus energizing the blinker lights W.

When the personal radio paging unit 9 receives a message signal "010" (decimal notation), a signal is issued over the driver output line R3 to turn on the solenoid switch L3, thereby energizing the position lamp P.

A second modification of the first embodiment will be described below with reference to FIGS. 2, 12, and 13. The second modification is particularly directed to the locking and unlocking the doors of an automobile.

As shown in FIG. 2, the driver door 2 (the door near the driver's seat) of the motor vehicle or automobile 1 has a keyhole 30 defined in its outer panel for receiving a key which operates a door lock in the door 2, and a door unlocking number keyboard 31 disposed on the outer panel and having pushbuttons bearing numbers 0 through 9. A number key cipher setting board (not shown) for cooperating with the number keyboard 31 is disposed at a suitable location in the passenger compartment. The door can be unlocked by entering a cipher number which has been preset on the number key cipher setting board, through the number key board 31 immediately after a door unlocking signal has been applied to the control unit S (described later).

Figure 12:
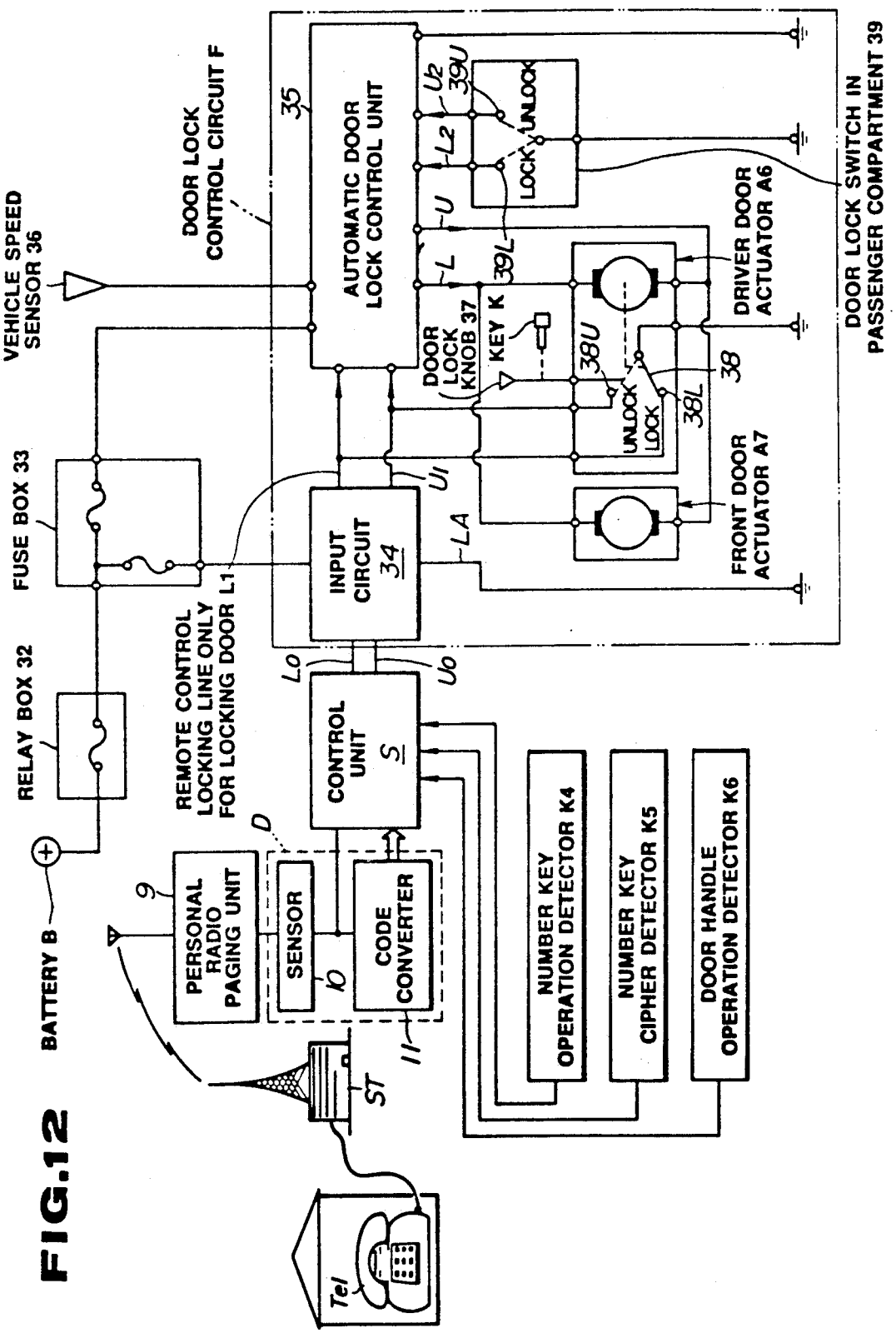
FIG. 12 is a block diagram of a second modification of the radio-signal-responsive vehicle device control system of the first embodiment, with respect to the locking and unlocking of a vehicle door.

As illustrated in FIG. 12, the personal radio paging unit 9, the sensor 10, the code converter 11, and the control unit S according to the second modification are identical to those shown in FIG. 1. The control unit S comprises a memory M storing various control programs P0, P1, P2, . . . , an input port I, an output port O, and a central processing unit CPU. The central processing unit CPU selects and executes one of the control programs Pi (i=0, 1, 2, . . . ) in the memory M in response to an operating electric signal applied from the code converter 11 to the input port I. The central processing unit CPU issues an output signal as a control signal from the output port O. When a control program for unlocking the doors under remote control is selected and executed, the output signal from the output port O is applied to a door lock control circuit F through a remote control locking signal line Lo or a remote control unlocking signal line Uo.

The input port I is supplied with a signal from a number key operation detector K4 which detects a number entered through the number key board 31, a signal from a number key cipher detector K5 which detects a cipher number set through the number key cipher setting board, and a signal from a door handle operation detector K6.

In FIG. 12, a battery B is connected to an input circuit 34 and an automatic door lock control unit 35 in the door lock control circuit F through a relay box 32 and a fuse box 33. The automatic door lock control unit 35 is supplied with a detected signal from a vehicle speed sensor 36. The automatic door lock control unit 35 is connected to a driver door actuator A6 and a passenger door actuator A7, both serving as remote control door lock actuators, through a locking line L and an unlocking line U.

These door actuators A6, A7 are arranged to lock the doors when a drive voltage is applied to the locking line L and to unlock the doors when a drive voltage is applied to the unlocking line U.

The input circuit 34 in the door lock control circuit F is connected to the remote control locking signal line Lo and the remote control unlocking signal line Uo, and is grounded through a ground line LA. The input circuit 34 and the automatic door lock control unit 35 are interconnected through a remote control locking line L1 and a remote control unlocking line U1. When an input signal is applied to the input circuit 34 through the remote control unlocking signal line Uo, the remote control unlocking line U1 is grounded through the ground line LA.

The driver door actuator A6 has a lock/unlock selector knob switch 38 ganged with a door lock knob 37, and can be operated by a key K to the automobile which is inserted through the keyhole 30 in the driver door 2. The lock/unlock selector knob switch 38 has a lock terminal 38L and an unlock terminal 38U which are connected respectively to the remote control locking line L1 and the remote control unlocking line U1.

The automatic door lock control unit 35 is couple to lock and unlock terminals 39L, 39U of a manual door lock switch 39 disposed in the passenger compartment through manual locking and unlocking lines L2, U2, respectively.

The door lock control circuit F is constructed such that when a signal from the vehicle speed sensor 36 is applied to the automatic door lock control unit 35, the automatic door lock control unit 35 supplies a door locking signal to the locking line L to operate the door actuators A6, A7 for automatically locking all the doors of the automobile. The door lock control circuit F is also constructed such that when the manual door lock switch 39 is shifted to the lock terminal 39L to ground the manual locking line L2, the automatic door lock control unit 35 supplies a door locking signal to the locking line L to operate the door actuators A6, A7 for automatically locking all the doors of the automobile. The door lock control circuit F is arranged such that when the manual door lock switch 39 is shifted to the unlock terminal 39U to ground the manual unlocking line U2, the automatic door lock control unit 35 supplies a door unlocking signal to the unlocking line U to operate the door actuators A6, A7 for automatically unlocking all the doors of the automobile.

The remote control locking line L1 is grounded in each of the following two occasions: When the lock/unlock selector knob switch 38 is shifted to the lock terminal 38L or when a signal is applied from the control unit S to the remote control locking line Lo, the remote control locking line L1 is connected to ground. When the remote control locking line L1 is grounded, the driver door actuator A6 is operated to lock the driver door 2. The remote control unlocking line U1 is grounded when the lock/unlock selector knob switch 38 is shifted to the unlock terminal 38U or when a signal is applied from the control unit S to the remote control unlocking line Uo. When the remote control unlocking line L1 is grounded, the driver door actuator A6 is operated to unlock the driver door 2.

The second modification will operate as follows:

First, the personal radio paging unit 9 is either stored in the storage box 8 by a person in the passenger compartment, or inserted from outside into the receiver insertion slot 4 behind the door handle 3. If the personal radio paging unit 9 is inserted into the receiver insertion slot 4, then the inserted personal radio paging unit 9 drops down the guide passage 5 into the storage box 8 on the inner panel of the door 2 which is located in the passenger compartment. A calling number is dialed by the pushbuttons of a general wire telephone unit TEL (FIG. 1), and those pushbuttons which represent a code number, e.g., "006" (decimal notation) corresponding to a desired message signal are pushed. A radio wave indicating these calling and message numbers is automatically radiated from a fixed radio station St of a telephone company, and the personal radio paging unit 9 receives the calling number and the following message number "006". In response to the calling number, the personal radio paging unit 9 generates a calling sound which is detected by the sensor 10. The sensor 10 then issues an output signal to turn on the power supply of the code converter 11 and the control unit S. Then, the personal radio paging unit 9 generates a sound corresponding to the message signal "006" which is subsequently received. The sensor 10 detects this sound and converts it into an electric signal, and then transmits the electric signal to the code converter 11. The code converter 11 converts the electric signal, representing "006" (decimal notation) into a prescribed operating electric signal, i.e., a four-digit binary digital code signal "0110". The code signal "0110" is then sent to the control unit S, which then selects and executes a program corresponding to the code signal "0110", i.e., a control program P6 stored in the memory M. In the second modification, the control program P6 is a program for unlocking the door under remote control, and is executed to remotely control the driver door actuator A6 to unlock the driver door such as when the driver inadvertently left the key to the automobile in the passenger compartment.

After the driver has sent the signals to the personal radio paging unit 9, the driver enters a prescribed cipher number through the number keyboard 31.

The program P6 for unlocking the door will be described with reference to FIG. 13.

Figure 13:
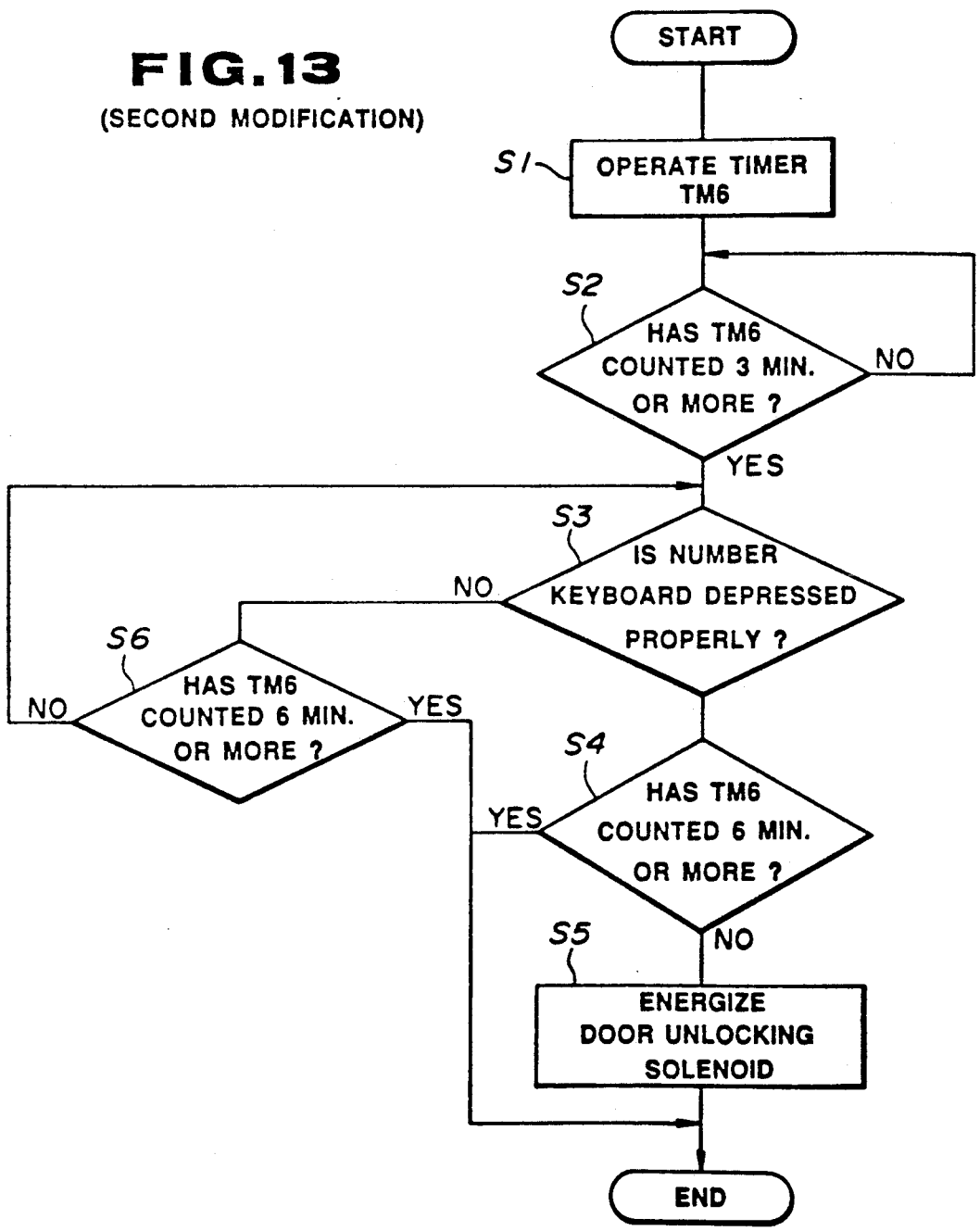
FIG. 13 is a flowchart of a program for unlocking the door in the radio-signal-responsive vehicle device control system according to the second modification.

The control unit S starts a timer TM6 in a step S1 in FIG. 13. Then, the control unit S determines whether or not the timer TM6 has counted 3 minutes or more in a step S2. After the timer TM6 has counted 3 minutes or more, the control unit S determines whether the number entered through the number keyboard 31 coincides with the cipher number. If yes, then control proceeds to a step S4 in which the control unit S determines whether or not the timer TM6 has counted 6 minutes or more. If not in the step S4, then the control unit S issues an output signal to the output port 0 thereof in a step S5. The output signal is applied to the input circuit 34 through the remote control unlocking signal line Uo. The remote control unlocking line U1 is grounded through the ground line LA. When the remote control unlocking line U1 is grounded, the driver door actuator A6 is operated to unlock the driver door. Thereafter, the power supply of the code converter 11 and the control unit S is turned off, and the door unlocking program P6 is finished.

If not in the step S3, then control goes to a step S6 which determines whether or not the timer TM6 has counted 6 minutes or more. If yes in the step S6, then the door is not unlocked and the program is ended. If not in the step S6, then control goes back to the step S3. If yes in the step S4, then the door is not unlocked and the program is ended.

The driver door actuator A6 is operated after 3 minutes or more have been counted by the timer TM6, on the assumption that it takes 3 minutes for the driver to return to the place where the automobile is parked after he sent the signal from a telephone unit near the automobile to the personal radio paging unit 9 in the automobile. The door of the automobile is therefore unlocked when the driver returns to the automobile. This prevents the automobile from being stolen. The decision blocks of the steps S3, S4, S6 are effective in preventing the door from being unlocked even if the program P6 starts being executed by an error signal applied. The step S3 may determine whether or not the door handle 3 is operated, rather than whether the number keyboard 31 is properly pushed, based on a signal from the door handle operation detector K6.

In the above example, the door cannot be unlocked unless a prescribed period of time has elapsed. However, it is possible to employ a control program for unlocking the door immediately after the number keyboard 31 is properly pushed subsequently to the reception of the message signal by the personal radio paging unit 9.

For operating a remote control automobile door locking device, from outside of the automobile, when the driver forgot to lock the doors, a message signal to select and execute a control program P7 for locking the doors under remote control is transmitted from a telephone unit with a pushbutton keypad dial. According to the control program P7, a locking signal is issued from the output port 0 of the control unit S to the remote control locking signal line Lo. When the locking signal i applied from the remote control locking signal line Lo to the input circuit 34 of the door lock control circuit F, the remote control locking line 11 is grounded, and the driver door actuator A6 is operated to lock the driver door 2. For opening and closing a power window, a power window regulator circuit may be employed in which the actuators A6, A7 in the electric circuit of FIG. 12 are replaced with power window regulator motors.

According to the first embodiment and its modifications, the radio-signal-responsive vehicle device control systems employ actuators for locking and unlocking the doors, and solenoids for turning on and off the lights.

According to a second embodiment of the present invention, a radio-signal-responsive vehicle device control system is combined with an automobile radio telephone unit.

Figure 14:
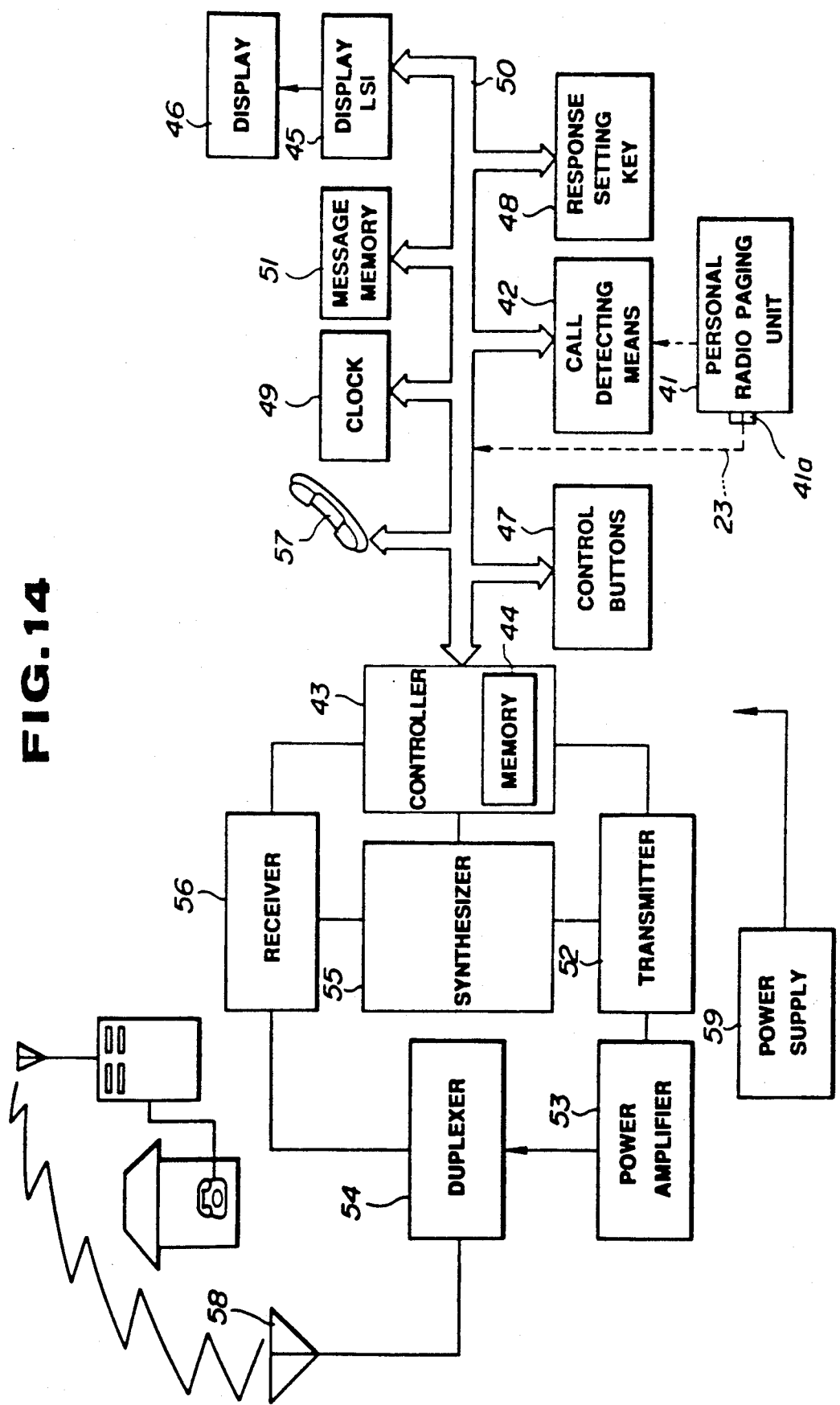
FIG. 14 is a block diagram of a radio-signal-responsive vehicle device control system according to a second embodiment of the present invention, which incorporates a motor vehicle radio telephone unit.

FIG. 14 shows in block form a radio-signal-responsive vehicle device control system according to a second embodiment of the present invention.

As shown in FIG. 14, the radio-signal-responsive vehicle device control system includes a selective calling unit (i.e., a so-called personal radio paging unit) 41, a transmitter 52, a power amplifier 53, a receiver 56, a duplexer 54, an antenna 58, a synthesizer 55, a controller 43, a memory 44, control buttons 47, a calling detector means 42, a response setting key 48, a message memory 51, a display LSI 45, a display 46, a handset 57, a clock 49, and a power supply 59. Major ones of these components and their relationship to each other will be described below.

In this embodiment, the selective calling unit 41 is provided as a receiver unit. The selective calling unit 41, which is a so-called personal radio paging unit, is responsive to a radio calling signal transmitted from a general telephone unit for home use or a public telephone unit through a telephone exchange office for producing an acoustic signal to let the user know the calling signal. The selective calling unit 41 however does not have an ability to send a response signal in response to the transmitted calling signal. The personal radio paging unit 41 is capable of receiving calling signals from a plurality of general telephone units.

The transmitter 52 transmits a tone signal produced by the synthesizer 55 through the controller 43, on a carrier by operating the control buttons 47 including keys in the form of a ten-key pad and other function keys, when a certain telephone number is dialed. A voice signal from the handset 57 is also transmitted from the transmitter 52. The signal from the transmitter 52 is amplified by the power amplifier 53, and then transmitted through the duplexer 54 from the antenna 58.

The receiver 56 receives a radio wave from the party being called or placing a call, amplifies the received signal in a radio frequency range and then an intermediate frequency range, and demodulates the signal to produce a voice signal.

The synthesizer 55 has a quartz oscillator and a frequency divider for generating signals of various frequencies required for signal transmission and reception automatically under commands from the controller 43.

The transmitter 52, the power amplifier 53, the duplexer 54, the synthesizer 55, and the receiver 56 jointly constitute a transmitter-receiver means responsive to a control signal from the controller 43 for automatically effecting signal transmission by dialing the telephone number of a telephone unit which has produced an outgoing signal to make a connection with the telephone unit.

The controller 43 serves to control the transmitter 52, the receiver 56, and the like based on signals from an input/output bus line 50. The controller 43 has the memory 44 which stores the telephone numbers and other data of parties who may call the user through the personal radio paging unit 41.

The control buttons 47 include numerical keys in the form of a ten-key pad for dialing telephone numbers and abbreviated telephone numbers and other function keys for holding a response and performing other functions. The calling detector means 42 serves to detect a calling acoustic signal from the personal radio paging unit 41 to gain access to the memory 44 in the controller 43. The response setting key 48 serves to find and fetch, from the memory 44, the data on the telephone number of a party who is calling the user, in order to make a connection with the calling party. The message memory 51 stores messages such as "ABSENT" and "WILL CALL YOU LATER". When the response setting key 48 is not operated upon after elapse of a certain period of time, the message "ABSENT" is transmitted from the message memory 51 through the controller 43, or if a hold key of the control buttons 47 is depressed, the message "WILL CALL YOU LATER" is transmitted from the message memory 51 through the controller 43.

The display LSI 45 and the display 46 are used to read the data stored in the memory 44 in the controller 43 and display a call through the personal radio paging unit 41 until the response of the user to the call is finished. At this time, if only one party is calling the user, the display 46 may simply display the call itself through a light-emitting diode (LED). If there are a plurality of calling parties at the same time, the display 46 may display the telephone numbers and names of the calling parties.

The clock 49 stores, into the memory 44, the time of detection of a calling signal based on the processing of the controller 43, or the time of operation of the response setting key 48.

Figure 15:
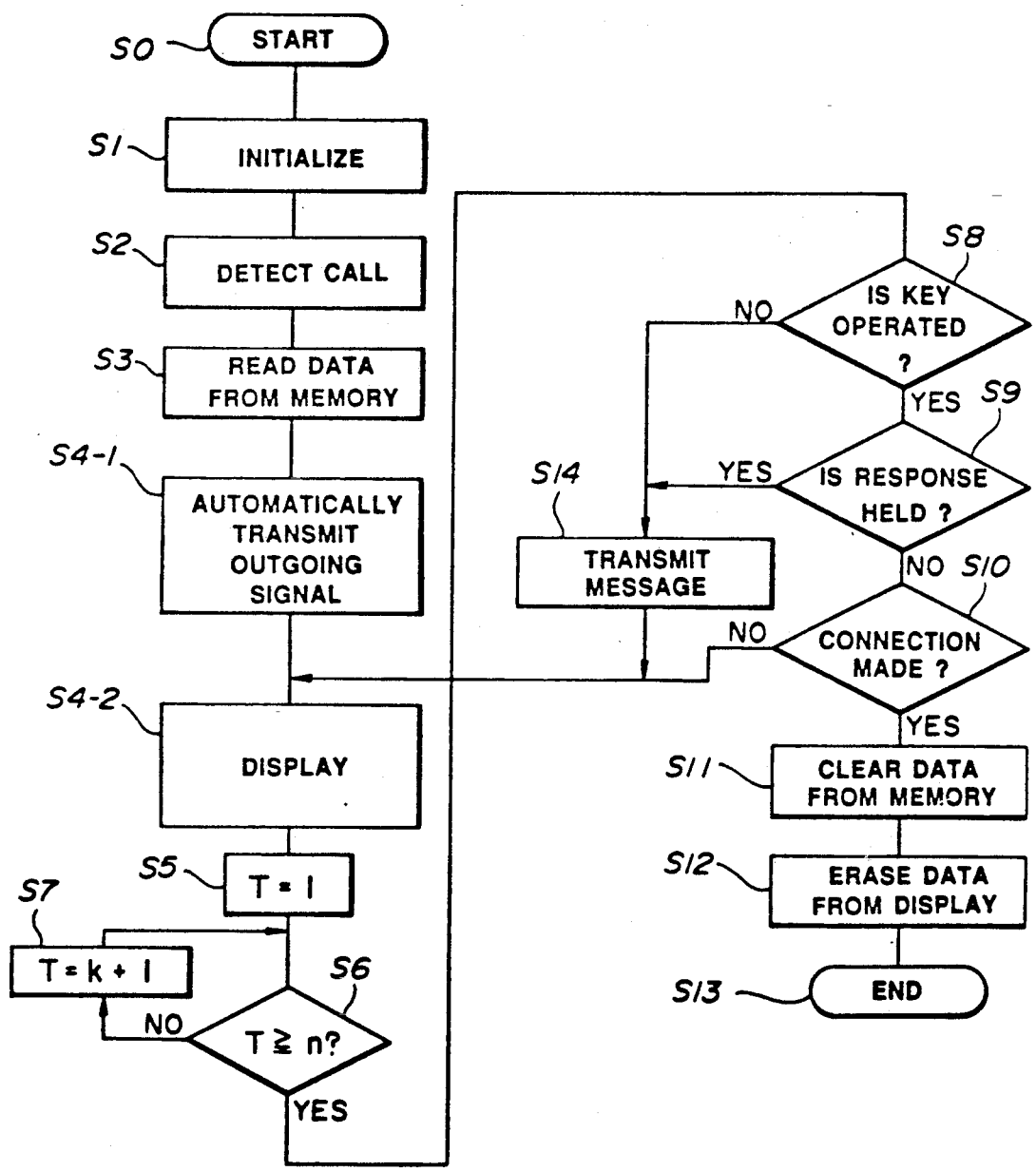
FIG. 15 is a flowchart of an operation sequence of the radio-signal-responsive vehicle device control system shown in FIG. 14.

Operation of the second embodiment will be described below with reference to the flowchart of FIG. 15. The reference characters S0 through S14 indicate steps of the flowchart.

When the key switch (not shown) of an automobile is turned on in the step S0, a telephone unit circuit is started to initialize the controller 43 in the step S1. A call through the personal radio paging unit 41 is detected in the step S2, allowing access to the memory 44 in the controller 43. Immediately at this time, the time of the call is stored from the clock 49 into the memory 44. The data on the calling party, among registered data on various parties which may place a call through the personal radio paging unit 41, are located and read out of the memory 44 in the step S3.

Based on the data read from the memory 44, an outgoing signal is automatically transmitted to the calling party in the step S4-1, and then the time, the name of the calling party, and the telephone number of the calling party are displayed on the display 46 by the display LSI 145 based on the read-out data in the step S4-2. These data items may immediately be displayed on the display 46, or only the call itself may be displayed through the energization of a light-emitting diode under normal condition, and the various data on the calling party may then be displayed on the display 46 in response to operation of the control buttons 47. After the display of the data, a timer is operated for a certain period of time in the steps S5, S6, S7. After the elapse of the certain period of time, it is checked whether the response setting key 48 has been depressed and the control button 47 is operated to hold a response in the steps S8, S9. If the response setting key 48 is not operated (S8n) or if the control button 47 for holding a response is operated (S9y), then the controller 43 reads the message "ABSENT" or "WILL CALL YOU LATER" from the message memory 51 and sends the message to the calling party in the step S14. If the response setting key 48 is operated (S8y) and if the control button 47 for holding a response is not operated (S9n), then since the user wishes to make a connection with the calling party, the handset 57 which may be stored in an armrest or a telephone set comprising the handset 57 and an actuator for moving the handset 57 out of an armrest or the like is used for the user to answer the call. Then, the step S10 determines whether there has been a connection made with the calling party. The connection can be confirmed by the continuation of an off-hook condition for a several seconds after the user goes off-hook. If there has been a connection (S10y), the read-out data with respect to the call are cleared from the memory 44 in the step S11, the displayed data are erased in the step S12, and the storage and display of the call through the personal radio paging unit 41 are brought to an end in the step S13. If there has been no connection (S10n), then the data are continuously displayed in the step S4-2.

According to the automobile radio telephone system of this embodiment, when a call is received by the personal radio paging unit 41, an outgoing signal is automatically sent to the calling party in response to the call, making a connection with the calling party through a nearby radio station. Therefore, no tracking device is necessary, and the entire system is simplified and made less costly.

In the second embodiment, the driver or a passenger is supposed to operate the control button 47 and the response setting key 48 in response to a call received through the personal radio paging unit 41. However, as illustrated in FIG. 14, the personal radio paging unit 41 may have a data call terminal 41a connected through a suitable interface to the bus line 50 for automatically reading data from the memories 44, 51 and displaying them on the display 46. This allows the radio telephone unit to automatically respond to an incoming call without operating the keys 47, 48. The arrangement is particularly effective for use in a so-called hands-free telephone unit which has no handset. In an automobile having a pillar light attached to a front pillar through a flexible hose, the hands-free telephone unit may advantageously be mounted, together with the pillar light, on the distal end of the flexible hose.

With the radio-signal-responsive vehicle device control system according to the second embodiment, an outgoing signal is automatically sent to a calling party based on a call made through a selective calling unit in view of the special characteristics of a mobile communication system. A simple and economic automobile radio telephone system can be provided according to the second embodiment.

A first modification of the second embodiment will hereinafter be described with reference to FIGS. 16 through 21.

Figure 16:
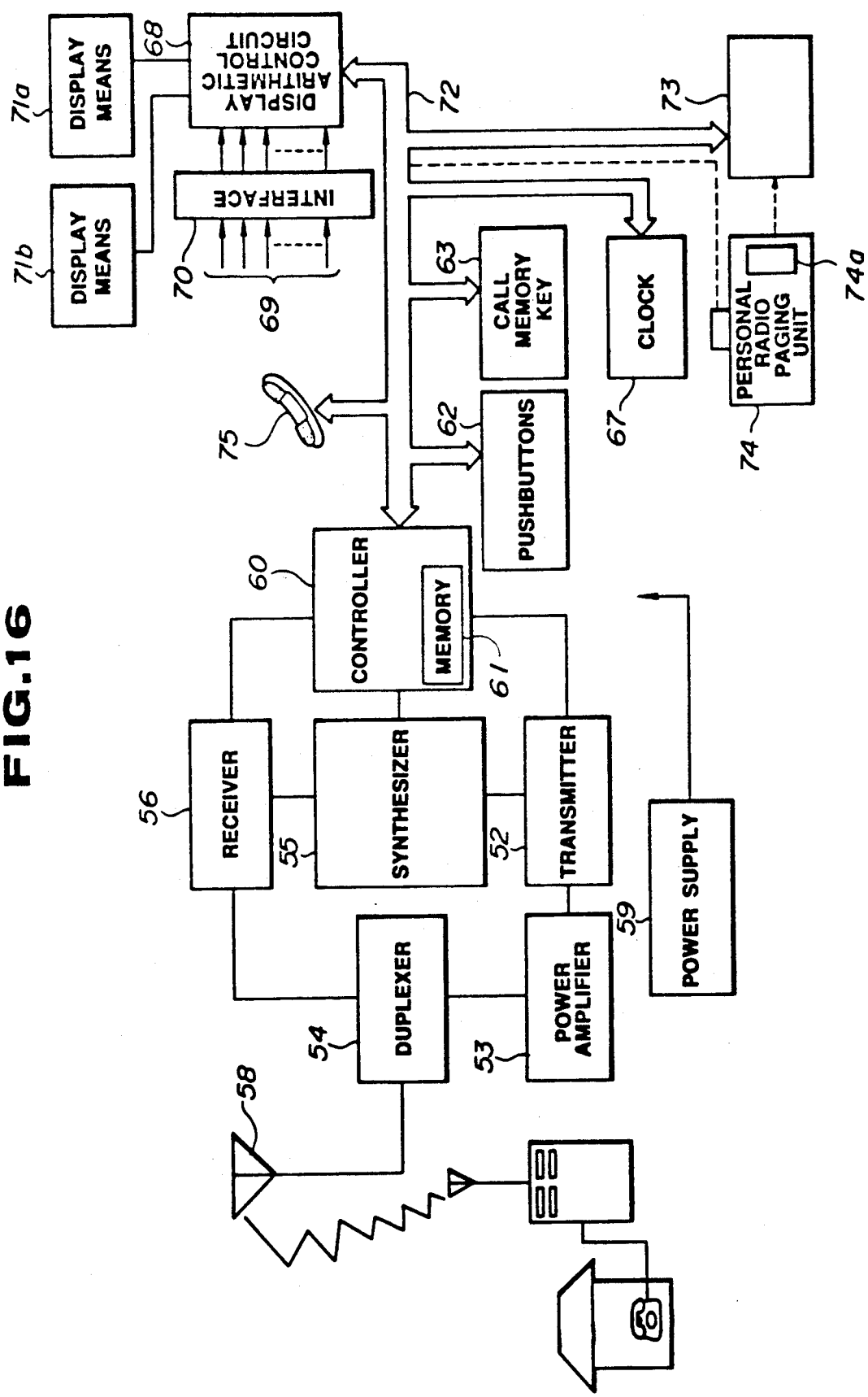
FIG. 16 is a block diagram of a modification of the radio-signal-responsive vehicle device control system according to the second embodiment shown in FIG. 14.

FIG. 16 is a block diagram of a radio-signal-responsive vehicle device control system according to the first modification.

As shown in FIG. 16, the radio-signal-responsive vehicle device control system includes a selective calling unit 74 as a receiver unit, a transmitter 52, a power amplifier 53, a receiver 56, a duplexer 54, an antenna 58, a synthesizer 55, a controller 60, a memory 61, a handset 75, a power supply 59, pushbuttons 62, a call memory key 63, a clock 67, an interface 70, a display arithmetic control circuit 68, display means 71a, 71b, and an imaging means 73. Major ones of these components and their relationship will be described below.

The selective calling unit 74, which is a so-called personal radio paging unit, produces an acoustic signal to let the user know a call from a certain party. The selective calling unit 74 however does not have an ability to send a response signal in response to the call. The personal radio paging unit 74 is capable of receiving calling signals from a plurality of general telephone units, and includes a display 74a for displaying the telephone number and the name of a calling party.

The transmitter 52 transmits a tone signal produced by the synthesizer 55 through the controller 70, on a carrier by operating the pushbuttons 62 including keys in the form of a ten-key pad and other function keys, when a certain telephone number is dialed. A voice signal from the handset 75 is also transmitted from the transmitter 52. The signal from the transmitter 52 is amplified by the power amplifier 53, and then transmitted through the duplexer 54 from the antenna 58.

The receiver 56 receives a radio wave from the party being called or placing a call, amplifies the received signal in a radio frequency range and then an intermediate frequency range, and demodulates the signal to produce a voice signal.

The synthesizer 55 has a quartz oscillator and a frequency divider for generating signals of various frequencies required for signal transmission and reception automatically under commands from the controller 60.

The controller 60 serves to control the transmitter 52 and the receiver 56 based on signals from an input/output bus line 72. The controller 60 has the memory 61 which stores the telephone numbers and other data of parties who may call the user through the personal radio paging unit 74.

The pushbuttons 62 include numerical keys in the form of a ten-key pad for dialing telephone numbers and abbreviated telephone numbers and other control keys for holding a response and performing other functions. The imaging means 73 serves to read an image displayed on the display 74a of the personal radio paging unit 74, such as data indicating the number or name which identifies a calling party, and issues the image as an image signal to the bus line 72. In the first modification of the second embodiment, the call memory key 63, the call memory key 63 stores a call itself made through the personal radio paging unit 74 and the image displayed on the display 74a, and allows access to the memory 61 in the controller 60. More specifically, when the call memory key 63 is depressed, a storage signal is issued to the controller 60 to store in the memory 61 a time signal indicating the calling time (the time at which the call is made through the personal radio paging unit 74) and the image signal read from the display 74a by the imaging means 73. Upon further operation of the call memory key 63, a calling signal is delivered to the controller 60 to read the time signal and the image signal from the memory 61. The time signal and the image signal thus read out are imaged or displayed at a suitable location by the display means 71. It is also possible to automatically store the call itself, the time thereof, and the telephone number and the like of the calling party in response to a calling sound generated by the personal radio paging unit 74, without employing the call memory key 63.

Figure 17:
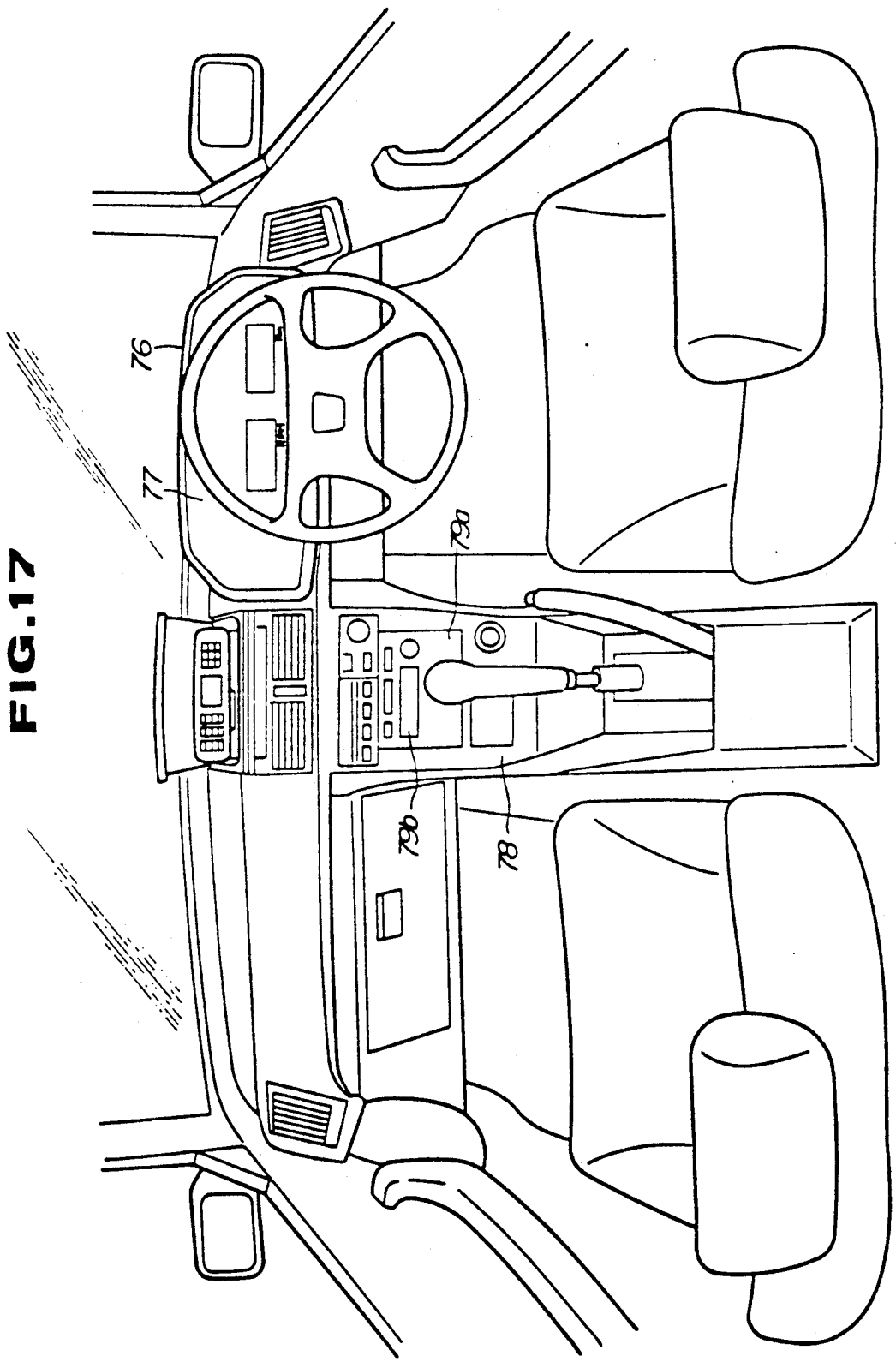
FIG. 17 is a schematic view showing the manner in which a motor vehicle radio telephone system shown in FIG. 16 is located in the passenger compartment of a motor vehicle.

The interface 70 serves to apply detected signals from sensors in the automobile to the display arithmetic control circuit 68. The display arithmetic control circuit 68 produces signals for displaying a running speed, a rotational speed, a traveled distance, etc., from detected signals 69 on the display means 71a, 71b from a speed sensor, a rotational speed sensor, and other sensors. The display means 71a, 71b may be those which are originally incorporated in the automobile. For example, as shown in FIG. 17, the display means 71a, 71b may be a light-emitting diode display means 77 in an instrumental panel 76 and a display means 79b in an audio device 79a in a central console 78. In response to an interrupt command from the call memory key 63, the display arithmetic control circuit 68 reads data from the memory 61 in the controller 60 and forcibly displays a call made through the personal radio paging unit 74 until the response to the call is finished, while interrupting the display of information regarding the audio device 79a. At this time, if only one party is calling the user, the display arithmetic control circuit 68 may simply display the call itself through a light-emitting diode (LED). If there are a plurality of calling parties at the same time, the display arithmetic control circuit 68 may display the telephone numbers and names which can identify the calling parties.

Figure 18:
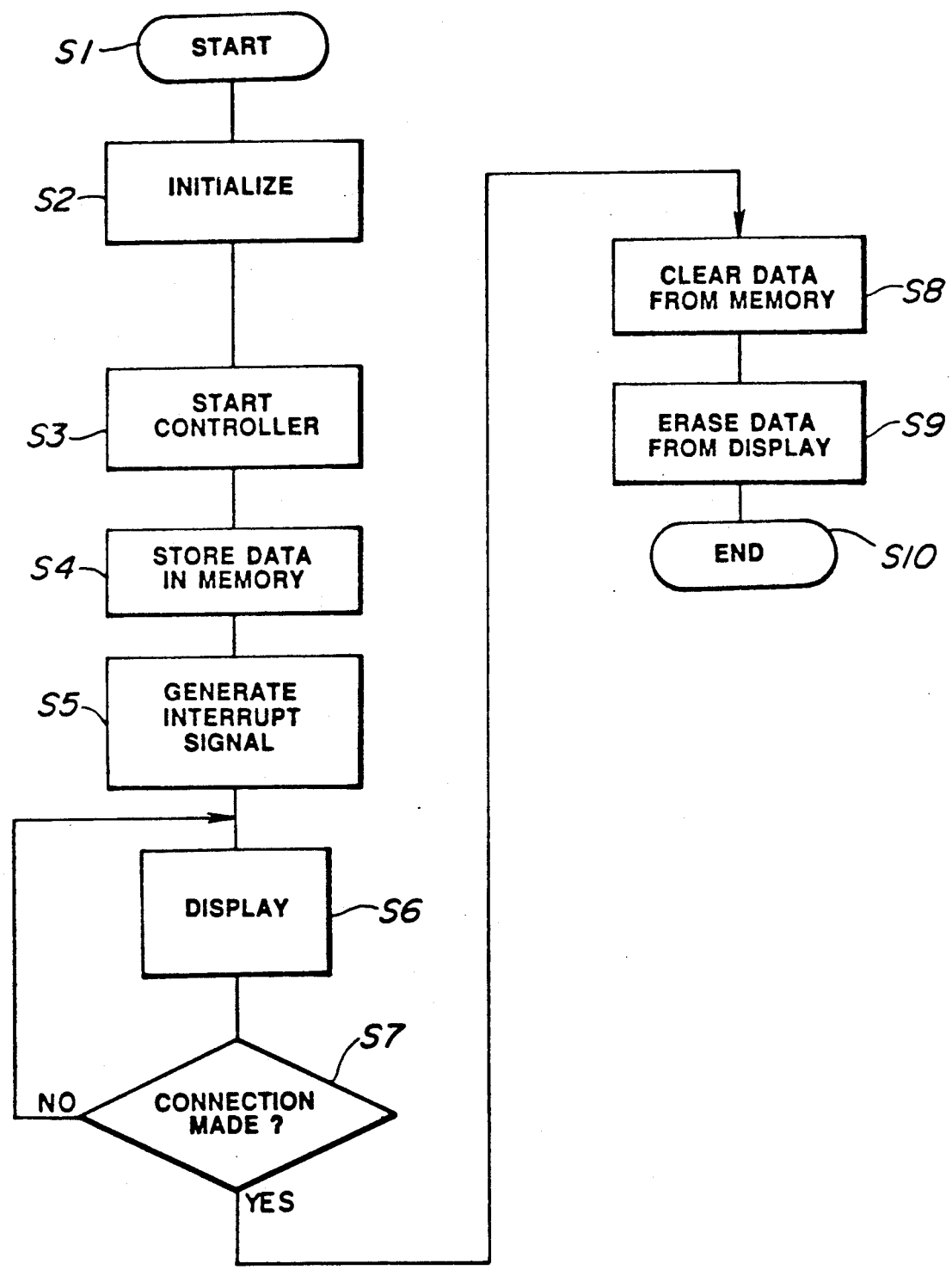
FIG. 18 is a flowchart of an operation sequence of the radio-signal-responsive vehicle device control device illustrated in FIG. 16.

Operation of the above modification will be described below with reference to the flowchart of FIG. 18. The reference characters S1 through S10 indicate steps of the flowchart.

When the key switch (not shown) of the automobile is turned on in the step S1, a telephone unit circuit is started to initialize the controller 60 in the step S2. The system is in a standby condition until a call is made through the personal radio paging unit 74 and the call memory key 63 is operated in response to the call. When a call is made through the personal radio paging unit 74 and the call memory key 63 is depressed, the controller 60 is started to allow access to the memory 61 in the controller 60 in the step S3. Immediately at this time, the time of the call is stored from the clock 67 into the memory 61. The information displayed on the display 74a of the personal radio paging unit 74 is read by the imaging means 73, and stored, along with the call itself, in the memory 61 in the step S3. At this time, an interrupt command is applied to the display arithmetic control circuit 68 by operating the call memory key 63. After the interrupt command has been confirmed by a flag in the step S5, the data in the memory 61 are transferred to display the time of the call, the name and telephone number of the calling party are displayed on the display means 71a or 71b in the step S6. Therefore, the driver of the automobile can easily confirm the calling party even while driving the automobile. Since the data on the calling party are stored, an outgoing signal can accurately be transmitted to the calling party at a later time. The display means 71a, 71b double as other display units, as described above. The data may immediately be displayed on the display means 71a or 71b, or only the call itself may be displayed through the energization of a light-emitting diode under normal condition, and then the data of the calling party may be displayed on the display means 71a or 71b after the corresponding pushbutton 62 has been depressed. The traveled distance or speed displayed on the display means 71a is positioned so that it can easily be visually confirmed by the driver. Therefore, the call can quite easily be confirmed by displaying it together with the above display.

Irrespective of whether the call is immediately displayed or displayed after the pushbutton is depressed, the displayed data are held until the telephone unit is connected through to the other party in response to the call made through the personal radio paging unit 74 (S7n). The connection can be confirmed by the continuation of an off-hook condition for a several seconds after the user goes off-hook. If there has been a connection (S7y), the readout data with respect to the call are cleared from the memory 61 in the step S8, the displayed data are erased in the step S9, and the storage and display of the call through the personal radio paging unit 74 are brought to an end in the step S10.

In the above modification, the driver or a passenger is supposed to operate the memory key 63 in response to a call received through the personal radio paging unit 74. However, as illustrated in FIG. 16, the personal radio paging unit 74 may have a data call terminal connected through a suitable interface to the bus line 72 for automatically writing data into the memory 61 and displaying them on the display means 71a, 71b.

The display means 71a, 71b described above comprise visual display units which are employed in existing audio devices in motor vehicles. However, desired data can be brought to the attention of the user by an acoustic indication, e.g., a synthesized speech sound.

In the above modification of the second embodiment, a hard copy may be produced of data displayed on the display 74a.

Figure 19:
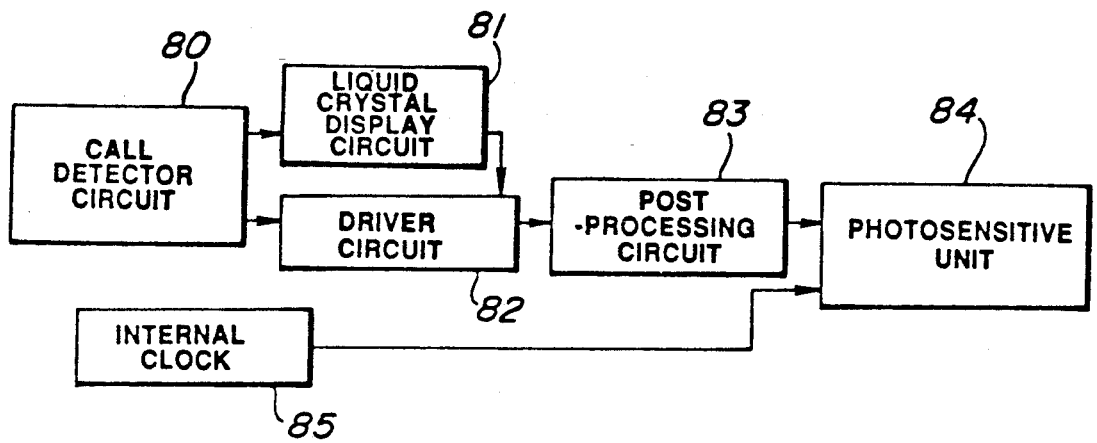
FIG. 19 is a block diagram of a copying system for copying information displayed on a display unit of a receiver unit employed in the modified radio-signal-responsive vehicle device control system shown in FIG. 16.
Figure 20:
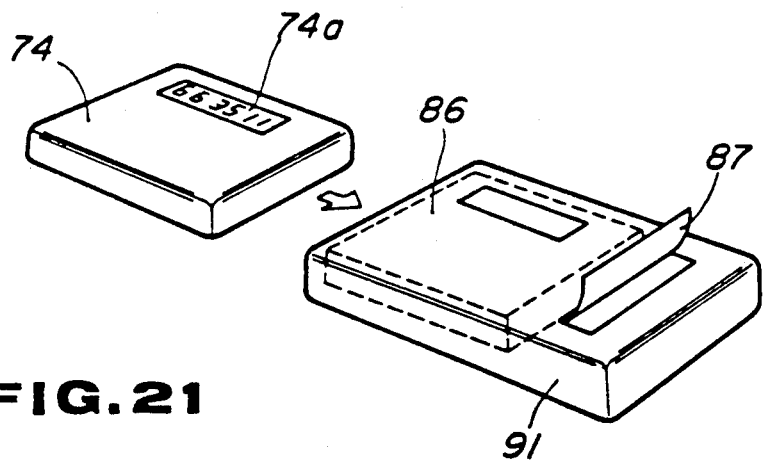
FIG. 20 is a perspective view of a storage means storing a copying unit for copying information displayed on the display unit of the receiver unit in the modified radio-signal-responsive vehicle device control system of FIG. 16.
Figure 21:
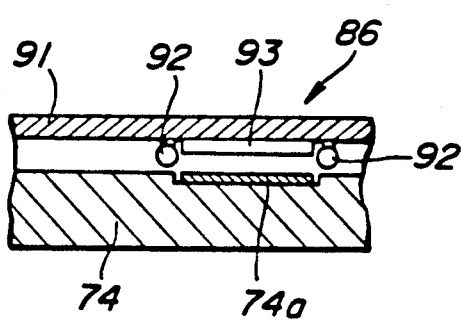
FIG. 21 is a fragmentary cross-sectional view of the storage means of FIG. 20 with the copying unit stored therein.

The data stored in the memory 61 may be printed out, but a location may be established in the motor vehicle as a storage means for the personal radio paging unit 74, and data displayed on the display 74a of the personal radio paging unit 74 may be copied as they are as shown in FIG. 19. More specifically, a call detector circuit 80 for detecting a calling signal from the personal radio paging unit 74 energizes a liquid crystal display circuit 81 to display certain data, and at the same time energizes a photosensitive unit driver circuit 82 to read the displayed data and then enables a post-processing circuit 83 to process the displayed data. The processed data and data from an internal clock 84 are then transferred or copied by exposure of a photosensitive unit 84 to these data. As shown in FIGS. 20 and 21, a copying unit 86 having illuminating light sources 92 and a photosensitive unit 93 may be incorporated in a case 91 to provide a storage means for accommodating the personal radio paging unit 74 therein, and after a call has been made, data displayed on the liquid crystal display 74a of the personal radio paging unit 74 stored in the case 91 may be copied on a sheet 87 by the copying unit 86.

Moreover, the radio-signal-responsive vehicle device control system may be combined with a loudspeaker or a blinker light mounted on an outer panel of an automobile body, and may be arranged such that the loudspeaker or blinker light can be energized by a control signal sent from a general telephone unit through a selective calling unit. With this arrangement, before the driver gets in the automobile, he can send a control signal from a general telephone unit to energize the loudspeaker to produce a sound or energize the blinker light to generate blinking light, thus providing an indication of the position of the automobile to allow the automobile to be easily located in a wide parking lot, for example.

According to the radio-signal-responsive vehicle device control system of the aforesaid modification of the second embodiment, since certain data of a party who makes a call through the selective calling unit are stored and displayed on the existing display means in a motor vehicle, the data can easily be visually confirmed, and an outgoing signal can accurately be sent to the calling party subsequently.

The selective calling unit used as the receiver unit in the radio-signal-responsive vehicle device control system according to the above modification of the second embodiment, certain data of a calling party can be displayed on the display. The selective calling unit may employ a recording and reproducing unit. Certain data of a calling party which are displayed on the display may be recorded by the user with a voice sound uttered by the user, and the recorded data may be reproduced when required and sent to the calling party.

Such a recording and reproducing unit for use in a selective calling unit as a receiver unit in a radio-signal-responsive vehicle device control system according to the present invention will hereinafter be described with reference to FIGS. 22 through 26.

Figure 22:
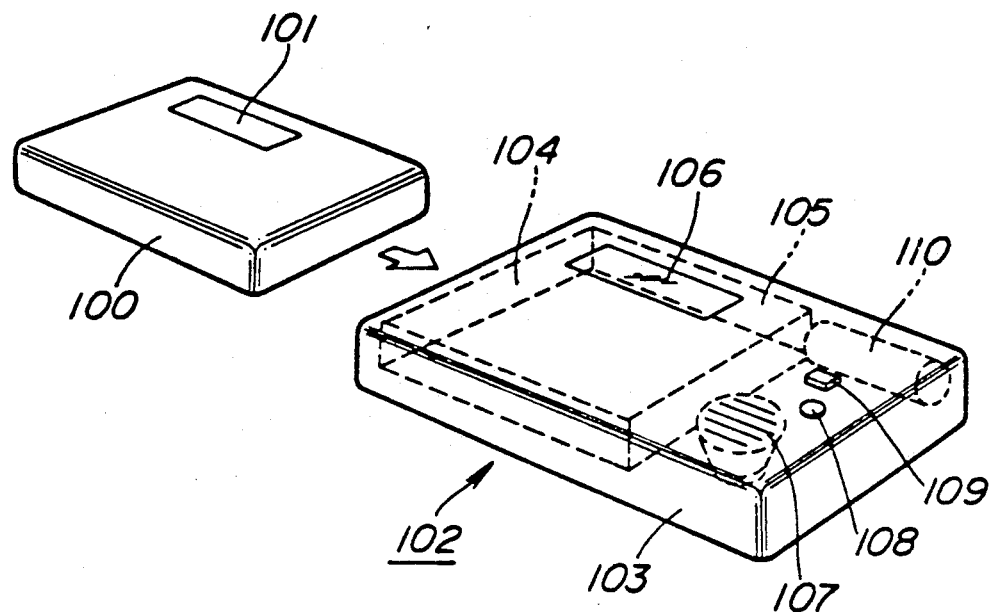
FIG. 22 is a perspective view of a recording and reproducing device for use with the receiver unit in the modified radio-signal-responsive vehicle device control system shown in FIG. 16.

FIG. 22 shows a selective calling unit 100 and a recording and reproducing unit 102 therefor.

The selective calling unit 100 is responsive to a call for generating an acoustic sound and displaying data of the calling party on a display 101.

The recording and reproducing unit 102 includes a portable case 103 having an opening 104 for inserting and holding the selective calling unit 100 and a space 105 communicating with the opening 104. The case 103 has a window means 106 defined in an upper panel thereof above the space 105. The window means 106 is in the form of an opening communicating with the space 105 or filled with a transparent plastic plate. When the selective calling unit 100 is inserted into the space 105, the display 101 thereof is positioned just below the window means 106. The window means 106 may be combined with a magnifying lens for allowing the user to see the display 101 at a magnified scale. The recording and reproducing unit 102 also has in its case a recording and reproducing loudspeaker 107, a recording and reproducing pushbutton 108, a recording IC 109, and a power supply battery 110.

Figure 23:
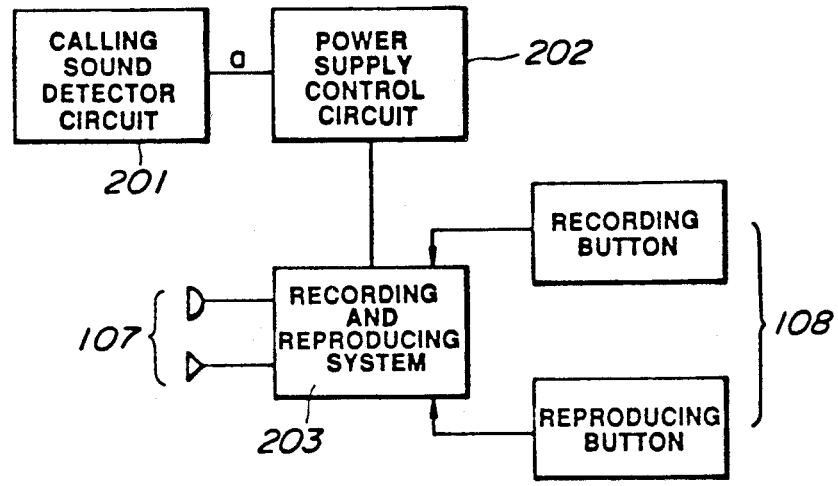
FIG. 23 is a block diagram of an electric circuit of the recording and reproducing device shown in FIG. 22.
Figure 24:
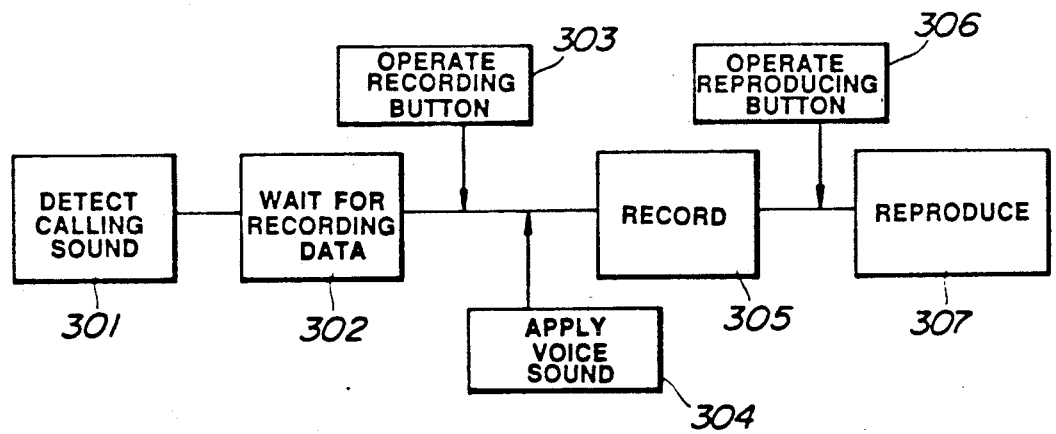
FIG. 24 is a flowchart of an operation sequence of the recording and reproducing device of FIG. 22.

FIG. 23 shows an electric circuit of the recording and reproducing unit 102. The recording and reproducing unit 102 includes a calling sound detector circuit 201, a power supply control circuit 202, a recording and reproducing system 203, a loudspeaker and microphone combination 107, and a recording and reproducing button 108. The arrangement of FIG. 23 will be described below with reference to the operation sequence of FIG. 24.

The calling sound detector circuit 201, serving as both detector and control means, has selective characteristics and level detecting characteristics such that it can detect only a calling sound from the selective calling unit 100, and is not disturbed by other sounds. When the calling sound detector circuit 201 detects a calling sound from the unit 100 (301), the calling sound detector circuit 201 generates a recording control signal a and send it as a starting command to the power supply control circuit 202. In response to the detected signal a, the power supply control circuit 202 turns on a biasing power supply which has been turned off, thereby bringing the recording and reproducing system 203 into a standby condition for recording data (302). The recording and reproducing system 203 may immediately record data at this time. The recording button 108 may be separate from the reproducing button, but they are illustrated as a common button. When the button 180 is first depressed, the power supply is turned on. When the button 180 is depressed next, the recording and reproducing system 203 records data, and when the button 180 is depressed once more, the recording and reproducing system 203 reproduces the recorded data. This sequence of modes is one cycle and cyclically repeated.

When the recording and reproducing system 203 is readied while the power supply is being turned on by the button 108, the button 108 is depressed again (303) to operate the recording and reproducing system 203, and a voice sound is applied (304) and recorded in a memory in the IC 109 (305). Then, the button 108 is depressed (306) again to reproduce the recorded data (307). Where the user has thus recorded the calling party or the like displayed in the window means 106, in the form of a voice sound, at the time a call is made, the user can subsequently make a call to the calling party at a desired time, without the danger of forgetting the calling party.

The recording and reproducing system 203 is of a known structure such as a speech input IC, and hence will not be described in detail. The recording and reproducing button 108 may be a slide switch having recording and reproducing positions.

Figure 25:
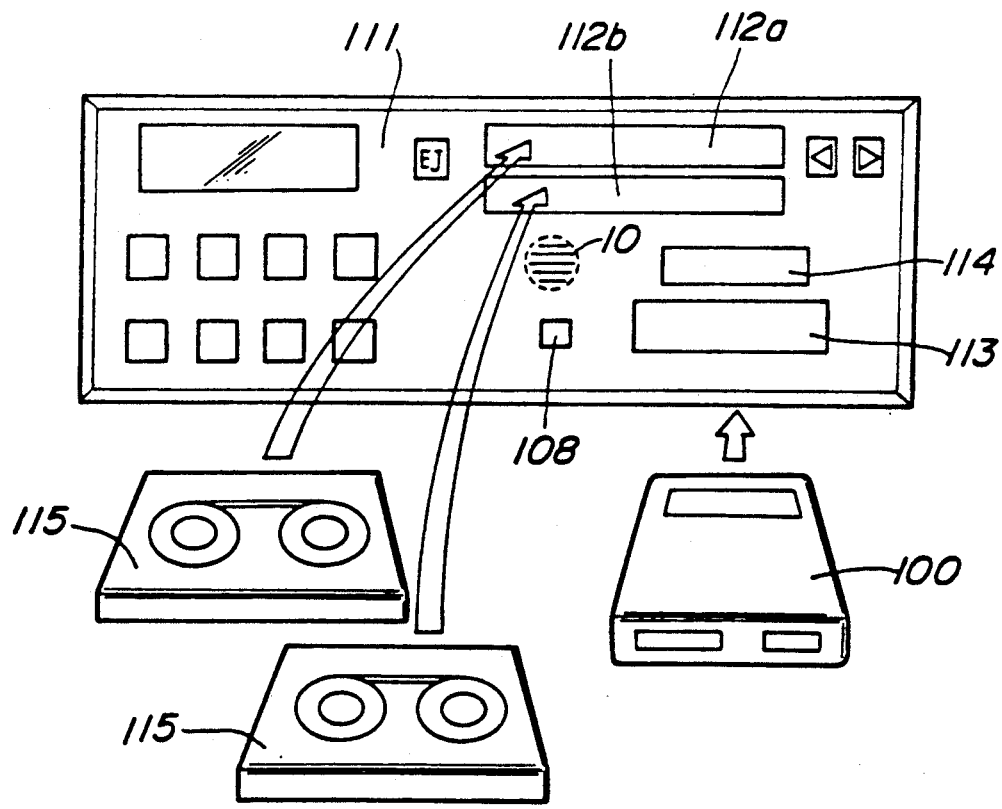
FIG. 25 is a schematic view of an audio device in a motor vehicle, incorporating the electric circuit of the recording and reproducing device shown in FIGS. 23 and 24.
Figure 26:
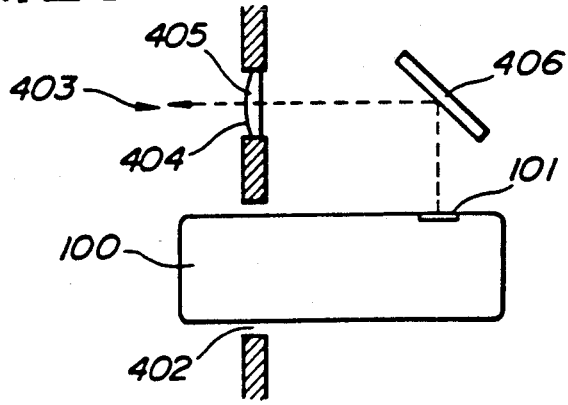
FIG. 26 is a view of a window means in the recording and reproducing device for allowing visual observation of a display screen on the receiver unit shown in FIG. 25.

FIG. 25 shows an arrangement for storing the information of a call made through the selective calling unit 100 by employing an audio device 111 in a motor vehicle. The audio device 111 is of the double-cassette type disposed in the central console of the motor vehicle, and has an insertion slot 113 for the selective calling unit 100 and a window means 114 for viewing data displayed on the display 101 of the unit 100. The window means 114 may be constructed as shown in FIG. 26, for example. Data displayed on the display 101 can be visually observed through a mirror 406 and a lens 405 disposed in an opening 404. The audio device includes a cassette unit capable of both reproducing and recording data, and has two insertion slots 112a, 112b each for receiving a cassette tape 115, a recording microphone 107, and a recording button 108. A normal cassette tape 115 is inserted into the insertion slots 112a, and a cassette 115 for recording a call is inserted into the insertion slot 112b. Therefore, a call can be recorded on the cassette tape 115 in the insertion slot 112b without interrupting music or the like which is being played back from the cassette tape 115 inserted in the insertion slot 112a. The audio device has a common drive system for the cassette tapes 115 inserted in the insertion slots 112a, 112b. The audio device is arranged such that while data is being recorded or reproduced from the cassette tape 115 in the insertion slot 112b, a material being reproduced from the cassette tape 115 in the insertion slot 112a or a program being heard from a radio set is muted. The other structural details are the same as those of FIG. 22, and will not be described in detail.

While data are recorded in the cassette tape 115 in the above embodiment, they may be recorded on a 3-inch floppy disc, for example.

By thus combining the selective calling unit with the recording and reproducing means, there can be provided a recording and reproducing device for use with the selective calling unit as the receiver unit in the radio-signal-responsive vehicle device control system of a simple construction, which recording and reproducing device can record necessary data with respect to a call without impairing the portability of the selective calling unit.

In the radio-signal-responsive vehicle device control systems of the second embodiment and its modifications, when a receiver unit such as a personal radio paging unit receives a signal from a calling party, a response setting key or a call memory key is operated to automatically transmit an outgoing signal to the calling party through the call detector means, the control means, the receiver and transmitter means, etc. to make a connection between the telephone unit of the user and the telephone unit of the calling party. According to the present invention, furthermore, there is provided a dialing system capable of simply and reliably dialing one of registered parties even in a motor vehicle which is vibrating.

Such a dialing system will now be described below with reference to FIGS. 27 through 31.

Figure 27:
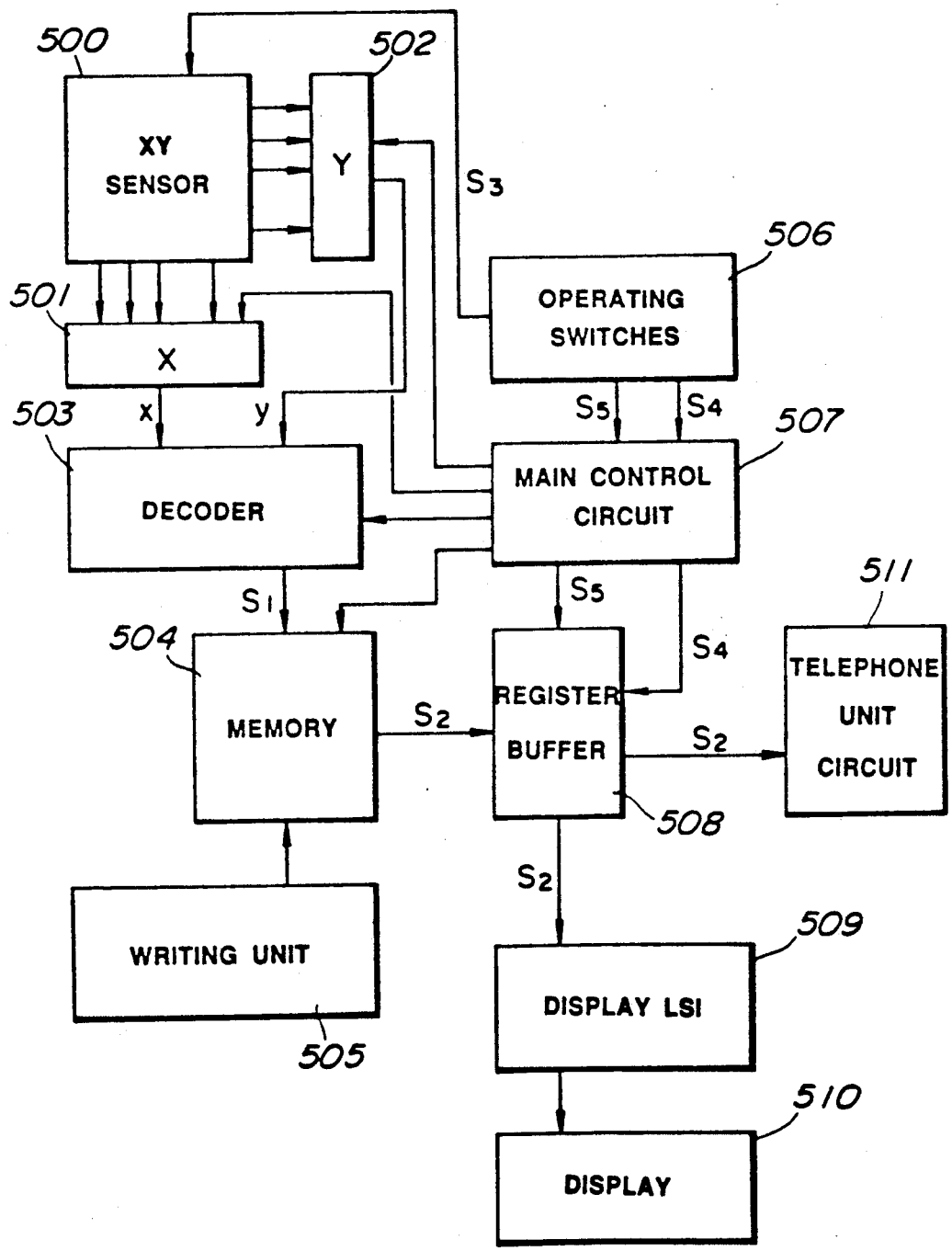
FIG. 27 is a block diagram of a dialing system in the radio-signal-responsive vehicle device control system according to the second embodiment.

FIG. 27 is a block diagram of a dialing system of the invention.

As shown in FIG. 17, the dialing system has an XY touch sensor 500, an X address controller 501, a Y address controller 502, a decoder 503, a memory 504, a writing unit 505, setting (operating) switches 506, a main control circuit 507, a buffer register 508, a display LSI 509, a display 510, and a telephone unit circuit 511. These circuit components will hereinafter be described.

The XY sensor 500 is of a known touch sensor capable of reading a two-dimensional graphic figure or the like through contact with part of a human body. For example, when a letter "A" is drawn on the figure by a finger, the XY sensor 500 can sense the letter "A". Data drawn on the sensor 500 are read out in X and Y directions by the address controllers 501, 502, respectively. The decoder 503 reads out the contents of a code (e.g., "A") drawn on the sensor 500 based on address information signals x, y from the address controllers 501, 502. A character code s1 read out by the decoder 503 is fed as an address signal to the memory 504. The memory 504 stores specific pieces of information of different parties, such as the telephone numbers, names, and the like of the parties, corresponding to codes which may be read by the decoder 503. The stored information of a party which corresponds to the code s1 is read out of the memory 504 as a code signal s2 into the buffer register 508. The X address controller 501, the Y address controller 502, the decoder 503, and the memory 504 are controlled by the main control circuit 507. Information to be stored can be written into the memory 504 by the writing unit 505.

The operating switches 506 serving as an operating means generates a signal s3 for enabling data to be written into the sensor 500, a signal s4 for opening a gate (not shown) of the buffer register 50 through the main control circuit 507 to transmit the data s2 relative to a party to be called as a dialing signal to the telephone unit circuit 511, and a signal s5 for clearing the data from the buffer register 508 through the main control circuit 507. The main control circuit 507 comprises a CPU for generally controlling the various circuit components shown in FIG. 27. The buffer register 508 serves to temporarily store the data signal S2 relative to the party which have been read from the memory 504, and may be included in the main control circuit 507. Under a command from the main control circuit 507, the data signal s2 is displayed on the display 510 through the display LSI 509, and also transferred to the telephone unit circuit 511.

The decoder 503, the main control circuit 507, the buffer register 508, which jointly serve as a retrieval means, retrieve the information of a party corresponding to graphic information from the memory 504 serving as a memory means, in response to the graphic information received from the sensor 500, the X address controller 501, and the Y address controller 502 which jointly constitute a sensor means, and then transfer the information as a dialing signal to the telephone unit circuit 511, i.e., a control means 43 or the like (described later on).

Figure 28:
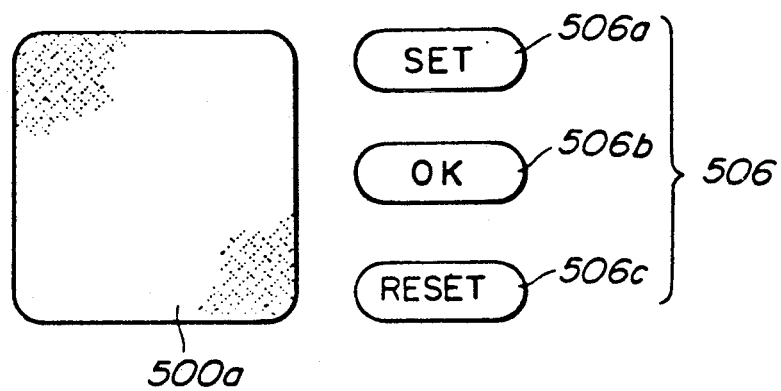
FIG. 28 is a view showing an XY touch sensor and switches in the dialing system shown in FIG. 27.

FIG. 28 shows a sensor surface 500a of the sensor 500 and the operating switches 506 disposed near the sensor surface 500a. The switches 506 include a setting switch 506a, a communication permit switch 506b, a resetting switch 506c. The setting switch 506a allows data to be written through the sensor surface 500a as by turning on the power supply of the sensor 500. After the user has confirmed that data such as a telephone number displayed on the display 510 in response to the information written through the sensor 500 belong to a desired party, the communication permit switch 506b is operated to open the gate of the buffer register 508 to transmit the data stored in the buffer register 508 to the telephone unit circuit 511. Conversely, when data such as a telephone number displayed on the display 510 do not belong to a desired party, the resetting switch 506c is operated to clear the data from the register 508 and allow data to be written again from the sensor 500. While the sensor 500 and the switches 506 are separately provided in FIG. 28, the switches 506 may be disposed in the surface 500a of the sensor 500.

Figure 29:
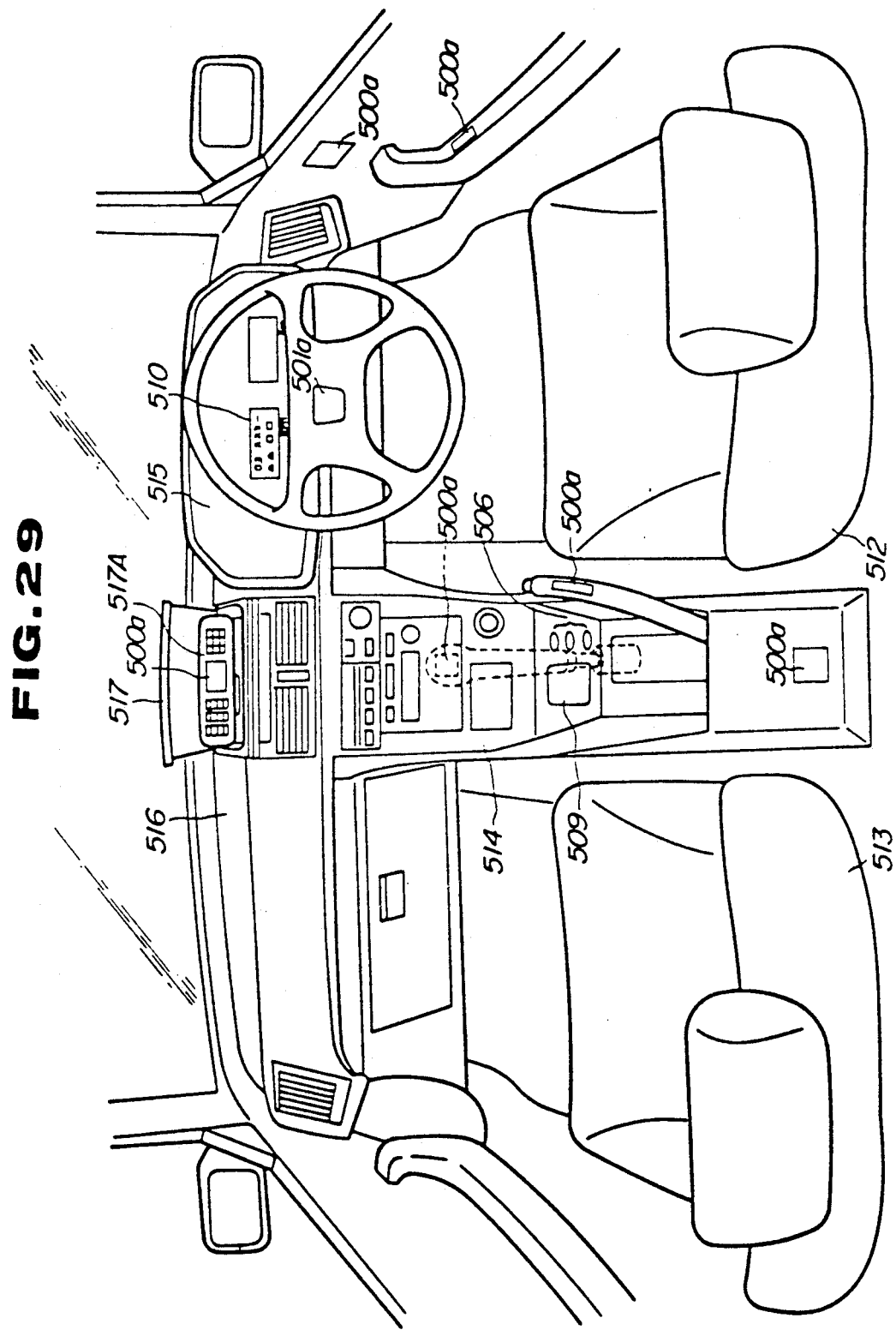
FIG. 29 is a view illustrating the XY touch sensor and the switches shown in FIG. 28 which are located in the passenger compartment of a motor vehicle.

As illustrated in FIG. 29, the sensor surface 500a and the operating switches 506 may be disposed on a central console 514 positioned between front seats 512, 513. The display screen 510 may be located for example in an instrumental panel 515, as shown in FIG. 29. Data such as a telephone number may be displayed by interrupting the operation of an existing display unit (such as a digital speedometer or a CRT), or may be displayed on a display unit separate from such an existing display unit. While a telephone handset 517A is accommodated in a storage pocket 517 in a dashboard 516 in FIG. 29, a so-called hands-free telephone system which has a transmitter and a receiver but does not have any handset may be employed.

Figure 30:
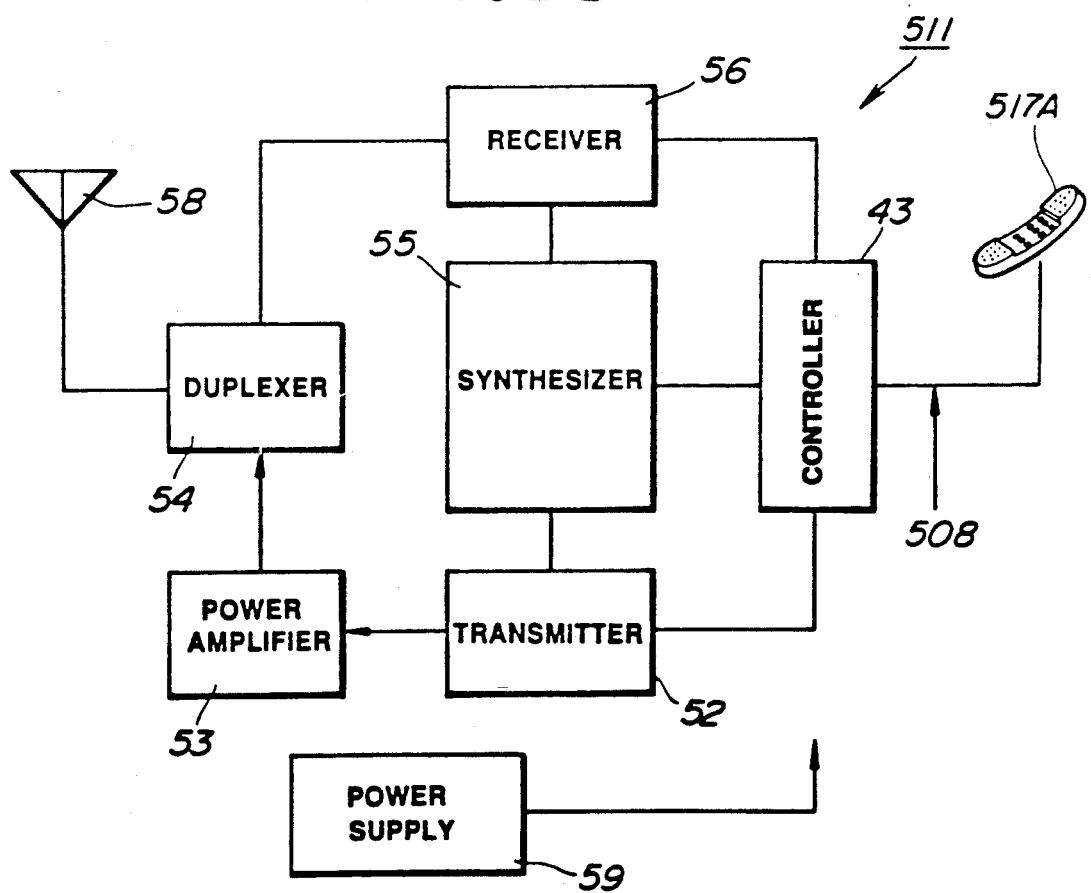
FIG. 30 is a block diagram of the dialing system of FIG. 27 which is incorporated in the radio-signal-responsive vehicle device control system of the second embodiment.
Figure 32:
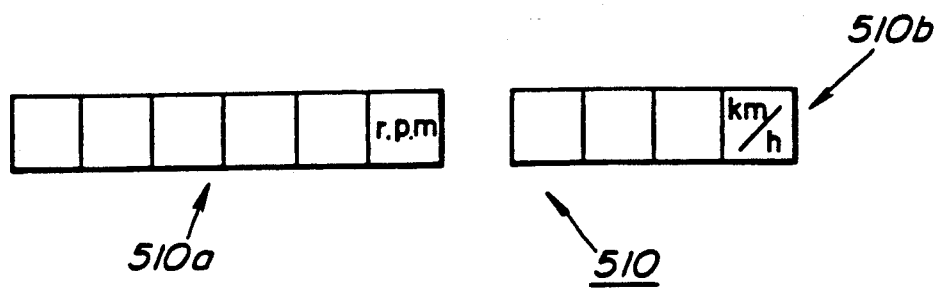
FIG. 32 is a view of the manner in which output signals from the dialing system of FIG. 27 are displayed.

FIG. 30 shows the telephone unit circuit 511 shown in FIG. 27. The telephone unit circuit 511 comprises the control means and the receiver and transmitter means according to the second embodiment illustrated in FIG. 14. More specifically, in response to the transmission of data from the register 508 to the controller 43, the telephone unit circuit 511 starts to operate to dial a certain party. That is, based on an output code as a dialing signal from the register 508, the controller 43 generates a calling signal (an outgoing signal) and transmits the calling signal through the transmitter 52, the power amplifier 53, and the duplexer 54 from the antenna 58. A voice sound of the user is also transmitted similarly from the handset 517A. A calling signal and a voice sound from the other party are delivered from the antenna 58 through the duplexer 54, the receiver 56, and the controller 43 to the handset 517A. The synthesizer 55 serves to change the intermediate frequency or the like during reception and transmission based on a command from the controller 43. As shown in FIG. 29, the sensor surface 500a may be disposed on the armrest near the driver seat, the lid of the central console, the parking brake lever, the shift lever, or the steering wheel, or may double as a display on the handset 517A. The display 510 may employ, as shown in FIG. 32, an engine speed display 510a for displaying five digits including those indicating an engine speed (r.p.m.) and a vehicle speed display 510b for displaying three digits including those indicating a vehicle speed (km/h). The engine speed display 510a displays six numerals including an area code, and the vehicle speed display 510b displays four subscriber numerals.

Figure 31:
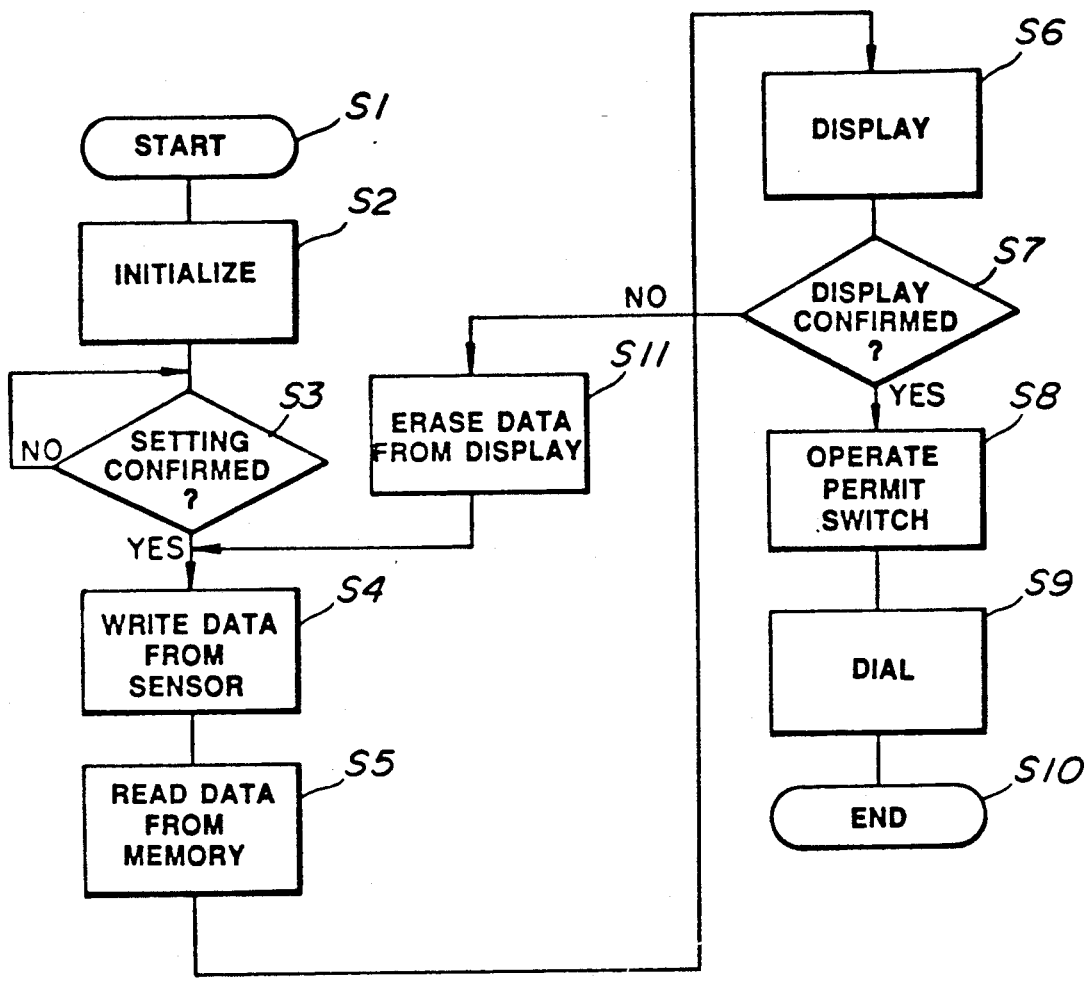
FIG. 31 is a flowchart of an operation sequence of the dialing system illustrated in FIG. 30.

Operation of the dialing system will now be described with reference to FIG. 31.

When the power supply of the system is turned on by the key switch (not shown) of the automobile, the system including the main control circuit 507 of FIG. 27 is started (S1). The main control circuit 507 and the register 508 are then initialized (S2). Operation of the setting button 506a (FIG. 28) is now rendered effective, and the main control circuit 507 confirms whether the setting button 506a is depressed or not (S3). If the setting button 506a is not depressed (S3n), the system is kept in a standby condition. If the setting button 506a is depressed (S3y), data entered from the sensor 500 can be written. When data are entered from the sensor 500 (S4), the data are read out of the memory 504 (S5) and immediately displayed on the display 510 (S6). Where data of one party are stored by way of a combination of plural letters, one letter is written and thereafter a switch on the sensor surface 500a at a suitable location is operated to confirm the writing of the letter. The letters are successively written in this manner. Thereafter, the status of the gate (not shown) of the register 508 which is connected to the LSI 509 is detected by a flag from the main control unit 507 to confirm the display (S7). If the displayed data are correct (S7y), the communication permit switch 506b (FIG. 28) is operated (S8) to transmit the data from the register 508 to the telephone unit circuit 511, thus starting to dial the telephone number of the party to be called (S9), after which the calling process is finished (S10). If the display data are wrong (S7n), then the resetting switch 506c (FIG. 28) is operated to clear the data from the register 508 and erase the displayed data (S11), so that next data can be written.

How many codes should be drawn on the sensor 500 to retrieve a telephone number, what data should be displayed, and how the displayed data and switch operation should be related to each other, can be determined as desired according to the known arrangements.

With the aforesaid dialing system, a call can be placed by entering a code or codes through the touch sensor. Therefore, an automobile ratio telephone unit can be provided as a radio-signal-responsive vehicle device control system which is capable of easily sending an outgoing call signal and reliably selecting a party to be called.

While two embodiments and their modifications of a radio-signal-responsive vehicle device control system have been described in detail, the present invention is not limited to the illustrated embodiments and modifications, and various design changes may be made therein without departing from the invention as defined in the scope of the claims.

For example, control programs in the first embodiment, e.g., a program for turning on or blinking tail lights or blinker lights, a program for turning on a horn, or a program for opening and closing a power window may be stored in the memory M of the control unit S.

While the lamps or lights are turned on in the first modification of the first embodiment, they may be blinked. The output from the code converter 11 in the first embodiment and its modifications may be of three different voltage values such as 1 volt, 2 volts, and 3 volts, rather than the four-digit digital code signal. Moreover, not only the lamps but also various other vehicle devices may be operated. In each of the embodiments, the personal radio paging unit or receiver unit may be stored in another suitable location in the passenger compartment rather than in the inner panel of the door 9 which faces the passenger compartment in the first embodiment. The personal radio paging unit or receiver unit may be a receiver means for producing vibration or turning on a prescribed lamp in response to a calling signal, other than generating a calling sound in response to a call signal. Where such a receiver means is employed, a sensor for detecting vibration or light may be disposed in place of the sound sensor 10. Furthermore, rather than detecting a signal received by the personal radio paging unit 9 with the sensor and transmitting the detected signal to the code converter 11 as indicated by the first embodiment, the personal radio paging unit 9 and the code converter 11 may directly be connected to each other through a connector line. Industrial Applicability The present invention provides a radio-signal-responsive vehicle device control system which can find general use and is of a low cost through the utilization of a general personal radio paging unit. In the illustrated embodiments, the radio-signal-responsive vehicle device control system is incorporated in a motor vehicle such as an automobile. However, the radio-signal-responsive vehicle device control system may be installed on an of various mobile devices for remotely controlling various devices or units on the mobile devices. Communication with a calling party which is transmitting a calling signal to the receiver unit can simply and reliably be achieved by the radio-signal-responsive vehicle device control system.

We claim:

1. A radio-signal-responsive vehicle device control system comprising:
   a personal paging unit in a paging system for receiving a radio signal generated based on a signal transmitted from a calling telephone unit and containing a sound transducer which is activated based on the received radio signal to generate sounds said personal paging unit being of the type for emitting when it receives a signal initiated by a calling telephone unit a small number of distinct detectable sounds for sensing by a user, such sounds including a calling sound followed by a message sound;
   personal paging unit storage means mounted in a motor vehicle for storing said personal paging unit;
   detector means located in relation to said personal paging unit storage means for detecting activation of the transducer and producing detected signals including the calling detected signal and a message detected signal corresponding to the detectable sounds form the transducer of said personal paging unit;
   control means which is activated by a calling detected signal from said detector means and operative for producing a control signal based on at least the message detected signal; and
   actuator means for controlling at least one device in the motor vehicle based on the control signal from said control means.

2. A radio-signal-responsive vehicle device control system according to claim 1, further comprising condition detecting means for detecting an operating condition of said device in the motor vehicle and applying a detected operating condition signal to said control means, said control means including means for producing and issuing said control signal in relation to said operating condition signal.

3. A radio-signal-responsive vehicle device control system according to claim 1, wherein said control means comprises a basic data unit having basic data embodying programs for recognition of messages and for producing appropriate control signals required for said actuator means to control a plurality of devices, respectively, in the motor vehicle, a comparator for comparing detected signals from said detector means with the basic data of said basic data unit and producing an output signal based on basic data which corresponds to the detected signals, and a driver responsive to the output signal generated by said comparator for applying the control signal to said actuator means to enable the latter to control one of said devices in the motor vehicle.

4. A radio-signal-responsive vehicle device control system according to claim 1, wherein said actuator means comprises as many actuators as the number of devices to be controlled in the motor vehicle, said control means including memory means storing as many control programs as there are said actuators for enabling the actuators to control said devices in the motor vehicle.

5. A radio-signal-responsive vehicle device control system according to claim 1, wherein said control means further includes timer means for starting to count time in response to at least one detected signal from said detector means, for generating the control signal to operate said actuator means after the timer means has counted a first predetermined time, and for generating a stop control signal to stop the operation of said actuator means after the timer means has counted a second predetermined time subsequent to said first predetermined time.

6. A radio-signal-responsive vehicle device control system according to claim 5, wherein said actuator means comprises a lamp energizing circuit for energizing a lamp of the motor vehicle as said device therein.

7. A radio-signal-responsive vehicle device control system according to claim 5, wherein said actuator means comprises a lamp-blinking circuit for blinking a lamp of the motor vehicle as said device therein.

8. A radio-signal-responsive vehicle device control system according to claim 1, wherein said actuator means comprises a door lock actuator, said control means comprising means responsive to the detected signals from said detector means for applying a door locking control signal to said door lock actuator to lock door means of a body of a motor vehicle.

9. A radio-signal-responsive vehicle device control system according to claim 1, wherein said personal paging unit is capable of generating first and second different detectable message sounds in response to at least two different signals applied thereto, and the detector means responds to said first and second message sounds producing first and second message detected signals, said control means including mean responsive to said first and second message detected signals from said detector means for issuing first and second control signals, respectively, to control said actuator means to perform different operations of controlling a vehicle device.

10. A radio-signal-responsive vehicle device control system according to claim 9, wherein said actuator means comprises a door lock actuator for locking a door of a body of a motor vehicle in response to said first control signal and for unlocking said door from the body of the motor vehicle in response to said second control signal.

11. A radio-signal-responsive vehicle device control system according to claim 10, further comprising a lock/unlock keyboard for locking and unlocking said door on and from the body of the motor vehicle, and a cipher detector for detecting operation of said keyboard according to a given cipher and applying a detected cipher signal to said control means, said control means including means for issuing said second control signal in response to the detected cipher signal issued from said cipher detector when said keyboard is operated according to the cipher, after the second detected signal from said detector means has been received.

12. A radio-signal-responsive vehicle device control system according to claim 11, wherein said control means further includes timer means for starting to operate in response to the second detected signal from said detector means, and means for issuing said second control signal in response to the detected cipher signal issued from said cipher detector when said keyboard is operated according to the cipher while said timer means is counting a given period of time between a first predetermined time and a subsequent second predetermined time.

* * * * *